(12) United States Patent
Yano

(10) Patent No.: US 7,612,464 B2
(45) Date of Patent: Nov. 3, 2009

(54) ELECTRONIC CONTROL SYSTEM WITH MALFUNCTION MONITOR

(75) Inventor: Masato Yano, Kariya (JP)

(73) Assignee: DENSO Corporation, Kariya (JP)

( * ) Notice: Subject to any disclaimer, the term of this patent is extended or adjusted under 35 U.S.C. 154(b) by 344 days.

(21) Appl. No.: 11/472,425

(22) Filed: Jun. 22, 2006

(65) Prior Publication Data

US 2006/0293831 A1    Dec. 28, 2006

(30) Foreign Application Priority Data

Jun. 23, 2005  (JP) .............................. 2005-183831
Jun. 23, 2005  (JP) .............................. 2005-183832

(51) Int. Cl.
   *G06F 11/30*        (2006.01)
(52) U.S. Cl. ...................... 307/10.1; 307/9.1
(58) Field of Classification Search ............... 307/10.1, 307/9.1
   See application file for complete search history.

(56) References Cited

U.S. PATENT DOCUMENTS

| | | | |
|---|---|---|---|
| 5,193,887 A * | 3/1993 | Bleckmann et al. .... | 303/122.07 |
| 5,343,840 A * | 9/1994 | Wataya et al. ............... | 123/399 |
| 5,601,063 A * | 2/1997 | Ohashi et al. ............... | 123/396 |
| 5,844,795 A * | 12/1998 | Johnston et al. ............... | 700/83 |
| 5,880,568 A | 3/1999 | Bederna et al. | |
| 5,895,434 A * | 4/1999 | Fennel et al. .................. | 701/48 |
| 5,927,251 A * | 7/1999 | Watanabe et al. ........... | 123/399 |
| 6,125,322 A | 9/2000 | Bischof et al. | |
| 6,480,780 B1 * | 11/2002 | Schwamm .................. | 701/100 |
| 6,580,974 B2 * | 6/2003 | Haag et al. ...................... | 701/1 |
| 6,615,119 B1 | 9/2003 | Shimizu | |
| 6,619,259 B2 * | 9/2003 | Tomita et al. ............... | 123/396 |

(Continued)

FOREIGN PATENT DOCUMENTS

DE            44 38 714 A1       5/1996

(Continued)

OTHER PUBLICATIONS

German Office Action dated Apr. 17, 2007 issued in corresponding German Appln. No. 10 2006 028 695.2-26, together with an English translation.

(Continued)

*Primary Examiner*—Stephen W Jackson
*Assistant Examiner*—Adi Amrany
(74) *Attorney, Agent, or Firm*—Nixon & Vanderhye P.C.

(57) ABSTRACT

An electronic control apparatus for a vehicle consists of a microcomputer and a monitor module. The microcomputer includes a vehicle-mounted actuator controller and a controller monitor. The controller monitor works to monitor the validity of a monitor subject associated with an operation of the actuator controller based on a value computed by the microcomputer and associated with the validity of the monitor subject and its expected value. The controller monitor monitors the malfunction of the actuator controller based on the validity of the monitor subject. The microcomputer outputs the computed value and the expected value to the monitor module. The monitor module monitors the malfunction of the controller monitor based on comparison between the computed value and the expected value. Specifically, the monitoring of the actuator controller and the monitoring of the controller monitor are performed simultaneously, thus resulting in greatly improved reliability in controlling a vehicle mounted actuator.

32 Claims, 17 Drawing Sheets

U.S. PATENT DOCUMENTS

| | | | |
|---|---|---|---|
| 6,655,357 B2 * | 12/2003 | Murakami et al. | 123/479 |
| 7,013,241 B2 | 3/2006 | Yamada | |
| 7,025,050 B2 * | 4/2006 | Oono et al. | 123/690 |
| 7,131,321 B2 * | 11/2006 | Okumura | 73/114.36 |
| 7,286,921 B2 * | 10/2007 | Kobayashi | 701/48 |
| 7,426,099 B2 * | 9/2008 | Soudier et al. | 361/23 |
| 7,437,218 B2 * | 10/2008 | Funcke et al. | 701/1 |
| 2003/0097628 A1 * | 5/2003 | Ngo et al. | 714/736 |
| 2004/0148036 A1 | 7/2004 | Sunami | |
| 2004/0172580 A1 | 9/2004 | Kabune et al. | |
| 2004/0254766 A1 | 12/2004 | Ito | |
| 2005/0251308 A1 | 11/2005 | Funcke et al. | |
| 2008/0270000 A1 * | 10/2008 | Bernzen | 701/79 |

FOREIGN PATENT DOCUMENTS

| | | |
|---|---|---|
| JP | 11-505587 | 5/1999 |
| JP | 2000-97810 | 4/2000 |
| JP | 2004-225635 | 8/2004 |
| JP | 2004-227346 | 8/2004 |
| JP | 2004-259137 | 9/2004 |
| JP | 2004-318672 | 11/2004 |
| JP | 2004-346746 | 12/2004 |
| JP | 2005-513356 | 5/2005 |

OTHER PUBLICATIONS

Office Action issued May 12, 2009 in corresponding Japanese Application No. 2005-183831 with an at least partial English-language translation thereof.

* cited by examiner

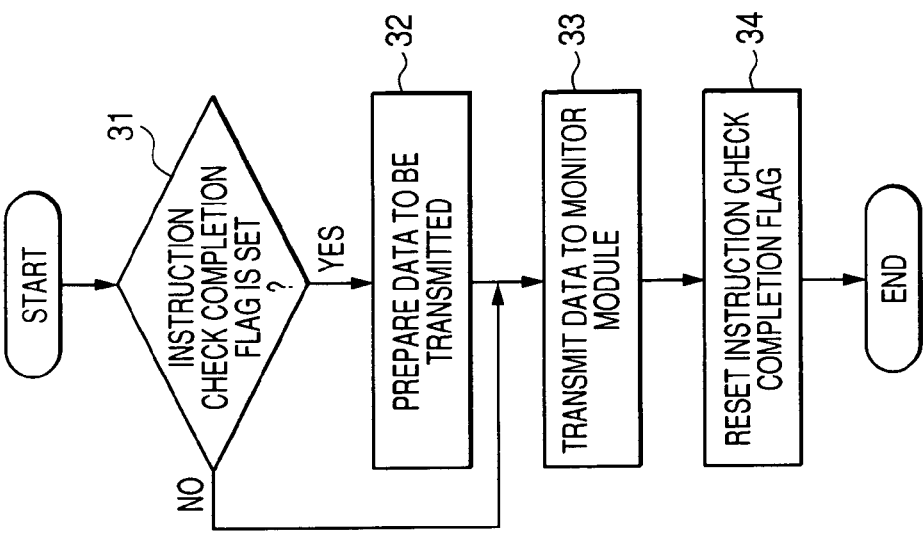
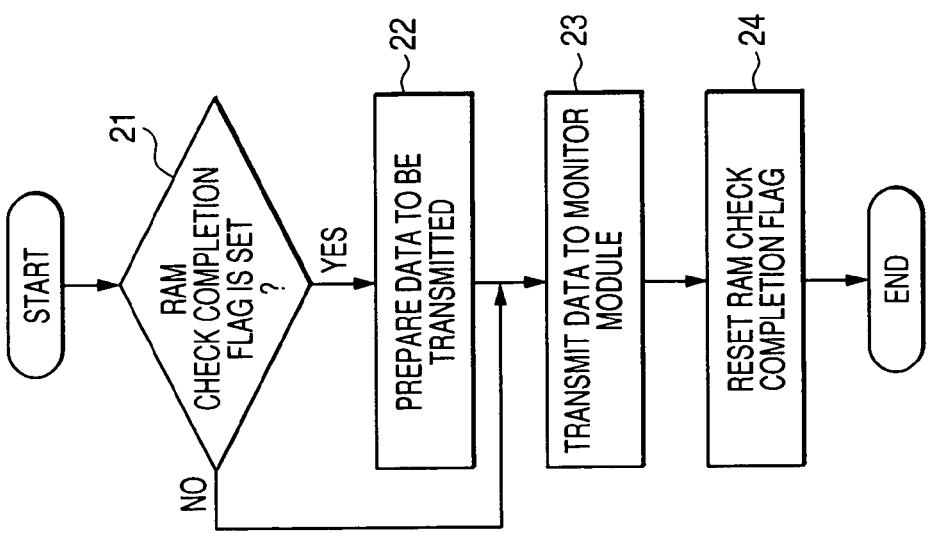
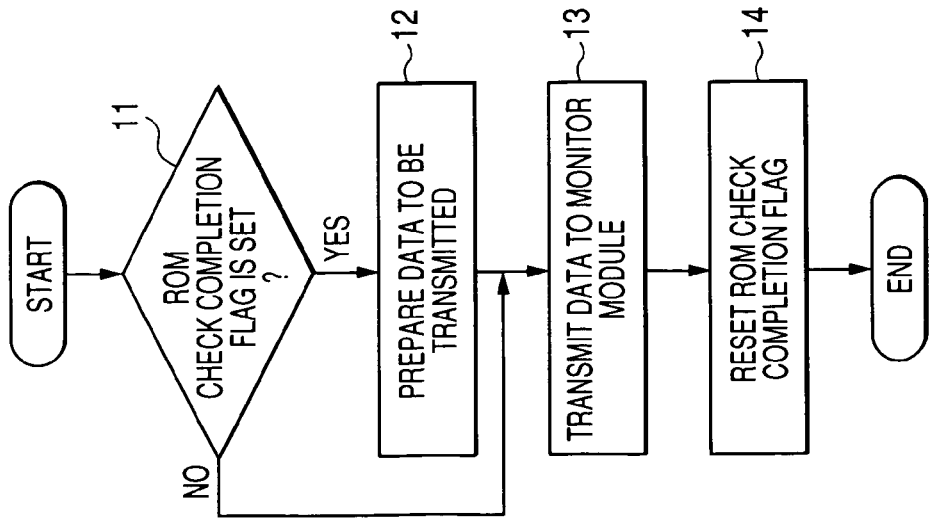

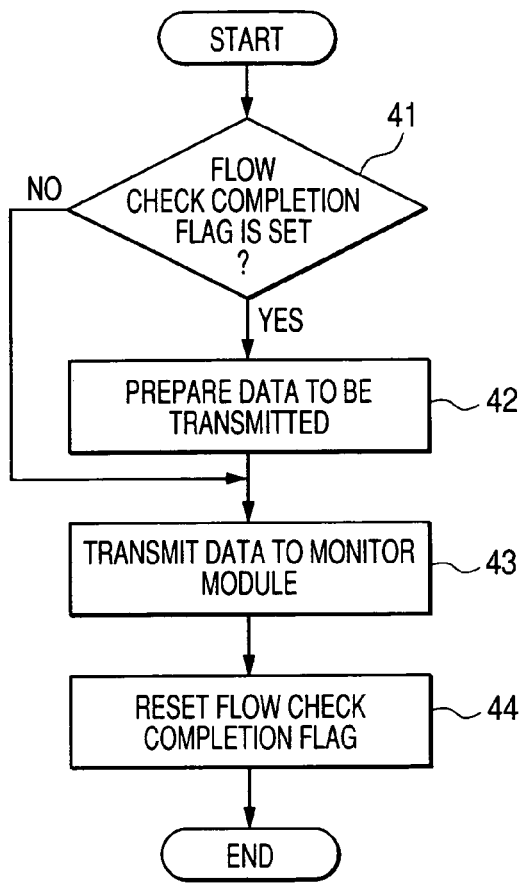
FIG. 10
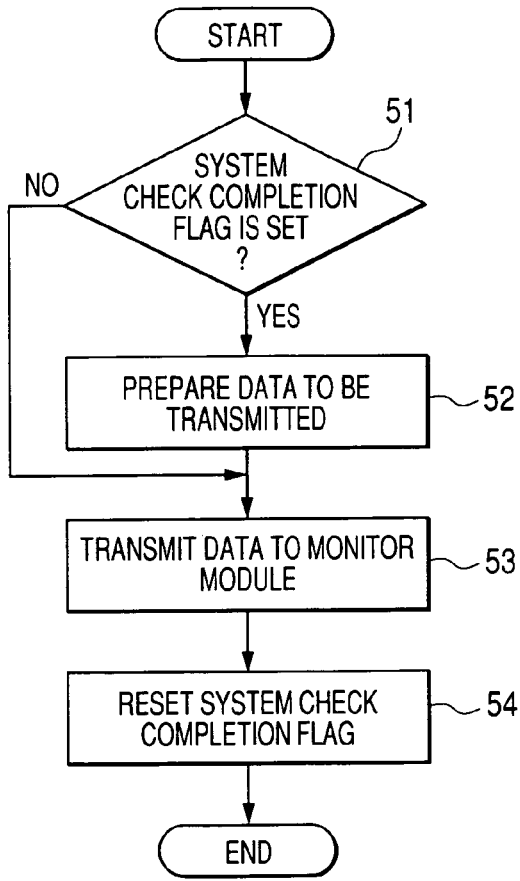
FIG. 11
FIG. 12
| ID | COMPUTED VALUE | EXPECTED VALUE |

ELECTRONIC CONTROL SYSTEM WITH MALFUNCTION MONITOR

CROSS REFERENCE TO RELATED DOCUMENT

The present application claims the benefit of Japanese Patent Application No. 2005-183831 filed on Jun. 23, 2005 and Japanese Patent Application No. 2005-183832 filed on Jun. 23, 2005, the disclosures of which are incorporated herein by reference.

BACKGROUND OF THE INVENTION

1. Technical Field of the Invention

The present invention relates generally to an electronic control system designed to electronically control an operation of an actuator such as an electric motor working to open or close a throttle valve for use in automotive engines, and more particularly to such a system designed to self-monitor a drive command issued to a driver circuit of a vehicle-mounted actuator from a microcomputer and also to monitor such a self-monitoring operation through a monitor module simultaneously.

2. Background Art

Japanese Translation of International Publication No. 11-505587 teaches the above type of electronic control system. FIG. 24 illustrates a typical electronic control system including the structure, as disclosed in the publication.

The electronic control system is designed to control an operation of an electric motor which works to open or close a throttle valve mounted in an automotive vehicle. The electronic control system consists essentially of a microcomputer 10, a monitor module 20, and a driver circuit 30.

The microcomputer 10 works to perform given operations to control the driving of the motor. Specifically, the microcomputer 10 includes an input circuit 11, a controller 12, a self-monitor 13, a program running circuit 14, and a communication circuit 15. The monitor module 20 includes a communication circuit 22 and a malfunction decision circuit 21.

The controller 12 receives an input signal indicative of an effort or position of an accelerator pedal through the input circuit 11 and computes a controlled variable of the motor for the throttle valve and outputs it to the driver circuit 30 in the form of a drive command.

The input signal is also received by the self-monitor 13. The self-monitor 13 works to analyze the drive command, as produced by the controller 12, to monitor the validity thereof. Specifically, the self-monitor 13 performs an operation, which is substantially identical with that in the controller 12, on the input signal, compares a result of the operation with the drive command, as sampled from the controller 12, and outputs a result of the comparison to the driver circuit 30 in the form of an information signal as representing the validity of the drive command.

The program running circuit 14 works to execute a monitoring program with the aid of the monitor module 20 to decide whether the self-monitor 13 is malfunctioning or not. Specifically, the program running circuit 14 is responsive to a test signal, as inputted from the monitor module 20 through the communication circuit 15, to initiate the monitoring program. The program running circuit 14 first outputs data, as specified by the monitoring program, to the self-monitor 13 to perform a given computation on the data and then samples and outputs a result of the computation to the monitor module 20 in the form of a data signal through serial communication between the communication circuit 15 and the communication circuit 22.

The monitor module 20 is implemented by an IC or a backup computer which is designed to sample the data signal inputted from the program running circuit 14. Specifically, the malfunction decision circuit 21 is responsive to input of the data signal to compare it with an expected value, as stored therein, and outputs a result of the comparison to the driver circuit 30 as representing a result of the monitoring of the self-monitor 13. The malfunction decision circuit 21 also works to output the test signal cyclically to the program running circuit 14 of the microcomputer 10.

The driver circuit 30 is responsive to the drive command, as outputted from the controller 12, to open or close the throttle valve through the motor and also receives outputs from the self-monitor 13 and the malfunction decision circuit 21. When the output from the self-monitor 13 indicates the fact that the result of computation, as produced in the self-monitor 13, does not match the drive command, as produced by the controller 12, or when the output from the malfunction decision circuit 21 indicates the fact that the value of the data signal does not match the expected value, the driver circuit 30 decides that the reliability of the drive command is low and enters a fail-safe mode to ignore the drive command.

As apparent from the above discussion, the electronic control system, as illustrated in FIG. 24, is designed to monitor both the drive command to be inputted to the driver circuit 30 through the self-monitor 13 and the malfunction of the monitoring operation of the self-monitor 13, thus resulting in improved reliability in controlling the throttle valve, but however, encounters the following drawback.

When the program running circuit 14 is responsive to the test signal from the monitor module 20 to monitor the validity of the operation of the self-monitor 13, it will cause the monitoring of the controller 12 (i.e., the drive command) by the self-monitor 13 to be interrupted by the program running circuit 14. It is, thus, impossible to determine the validity of the drive command outputted from the controller 12 to the driver circuit 30 during the monitoring operation of the monitor module 20. There is still left room for improvement of the reliability in controlling the throttle valve. In favor of the monitoring of the controller 12 by the self-monitor 13, it is possible to decrease the number of times the malfunction decision circuit 21 outputs the test signal to the program running circuit 14, but however, resulting in decreased reliability in monitoring the self-monitor 13 through the monitor module 20.

SUMMARY OF THE INVENTION

It is therefore a principal object of the invention to avoid the disadvantages of the prior art.

It is another object of the invention to provide an electronic control system for vehicles which is designed to have greatly improved reliability in controlling an operation of a vehicle-mounted actuator.

According to one aspect of the invention, there is provided an electronic control apparatus for a vehicle such as an automobile to ensure a higher degree of reliability in controlling a vehicle-mounted actuator. The electronic control system comprises: (a) a microcomputer including an actuator controller and a controller monitor, the actuator controller working to control an operation of an actuator mounted in a vehicle in response to an input signal indicating a parameter associated with a preselected operating condition of the vehicle, the controller monitor working to monitor validity of a preselected monitor subject associated with an operation of the actuator controller based on a value that is computed by the microcomputer and associated with the validity of the monitor subject and an expected value of the computed value, the controller monitor working to monitor whether the actuator controller is operating properly or not based on the monitored validity of the monitor subject, the microcomputer outputting the computed value and the expected value; and (b) a monitor module including a digital circuit which is designed to monitor whether the controller monitor is operating properly or not based on comparison between the computed value and the expected value, as inputted from the microcomputer, and to output a signal indicative thereof. Specifically, the monitoring of the actuator controller by the controller monitor and the monitoring of the controller monitor of the microcomputer by the monitor module are performed in parallel to each other, thus resulting in increased reliability in controlling the actuator mounted in the vehicle without sacrificing either of the monitoring of the actuator controller or the monitoring of controller monitor.

In the preferred mode of the invention, when a period of time in which the computed value continues to be different from the expected value exceeds a predetermined time, the monitor module may determine that the controller monitor is malfunctioning.

The monitor module may be equipped with a data error counter which counts up in response to input from a plurality of clocks, as used to determine a reference speed at which the digital circuit operates, and is cleared upon agreement of the computed value with the expected value. When a count value of the data error counter exceeds a preselected value, the monitor module determines that the period of time in which the computed value continues to be different from the expected value has exceeded the predetermined time.

When a period of time in which the computed value and the expected value have failed to be received by the monitor module exceeds a preselected time, the monitor module may determine that communication with the microcomputer is failing.

The monitor module may also be equipped with a communication error counter which counts up in response to input from a plurality of clocks, as used to determine a reference speed at which the digital circuit operates, and is cleared when the monitor module has received the computed value and the expected value. When a count value of the communication error counter exceeds a preselected value, the monitor module determines that the communication with the microcomputer is failing.

The monitor module may also be equipped with a reference counter which counts up in response to input of each of the clocks. The microcomputer may also include a module monitor designed to analyze a count value of the reference counter to determine whether the monitor module is operating properly or not.

The module monitor works to sample the count value of the reference counter cyclically and determines that the monitor module is malfunctioning when a period of time in which the count value continues to be unchanged exceeds a preselected time.

The controller monitor may also monitor the validity of an additional preselected monitor subject, which ensures the validity of the operation of the actuator controller, based on a value that is computed by the microcomputer and associated with the validity of the additional preselected monitor subject and an expected value thereof. The microcomputer adds an identifier to a combination of each of the computed values and a corresponding one of the expected values and transmits the combinations to the monitor module in the form of data signals. The monitor module also includes an additional digital circuit and analyzes the identifiers of the data signals to provide each of the combinations of the computed and expected values to a corresponding one of the digital circuits. Each of the digital circuits compares the computed value with the expected value to determine whether the controller monitor is operating properly or not.

The monitor module may include, as the digital circuits, a first digital circuit and a second digital circuit. The first digital circuit is designed to determine whether the computed value is coincident with the expected value or not to monitor whether the controller monitor is operating properly or not. The second digital circuit is designed to determine whether computed value is greater than the expected value or not to monitor whether the controller monitor is operating properly or not.

The controller monitor may also monitor the validities of additional preselected monitor subjects, which ensure the validities of the operation of the actuator controller, based on values that are computed by the microcomputer and associated with the validities of the additional preselected monitor subjects and expected values thereof, respectively. The microcomputer may break down the monitor subjects into a first and a second group according to modes of monitoring of the monitor subjects. At least the first group consists of a plurality of the monitor subjects. The microcomputer also computes a value as a function of the computed values associated with the first group and outputs a combination of the computed value and an expected value thereof in the form of a first data signal with an identifier and a combination of the computed value associated with the second group and the expected value thereof in the form of a second data signal with an identifier. The computed value carried by one of the first and second data signals is to be determined by one of the first and second digital circuits of the monitor module whether the computed value is coincident with the expected value or not to determine whether the controller monitor is operating properly or not. The computed value carried by the other of the first and second data signals is to be determined by the other of the first and second digital circuits of the monitor module whether the computed value is greater than the expected value or not to monitor whether the controller monitor is operating properly or not.

The microcomputer may produce a sum of the computed values associated with the first group as the value computed as a function of the computed values associated with the first group and transmit the sum and an expected value thereof to the monitor module in the form of the first data signal. The monitor module determine through the first digital circuit whether the sum is coincident with the expected value or not to determine whether the controller monitor is operating properly or not.

The monitor subjects to be monitored by the controller monitor may be two of (1) a control program which is stored in a read-only memory installed in the microcomputer and to be executed by the actuator controller, (2) data which is stored in a data RAM installed in the microcomputer as a value computed by the actuator controller, (3) a fixed value which is a value derived by computing a simulation data in the actuator controller, (4) an order in which functions are read out by the actuator controller, and (5) a value computed by the actuator controller based on the input signal indicating the parameter associated with the preselected operation of the vehicle.

The monitor module may alternatively include a higher speed digital circuit that is the digital circuit and a lower speed digital circuit. The controller monitor may monitor the validities of additional preselected monitor subjects in cycles, respectively, which ensure the validities of the operation of the actuator controller, based on values that are computed by the microcomputer and associated with the validities of the additional monitor subjects and expected values thereof. The microcomputer may alternatively break down the monitor subjects into a first and a second group. At least the first group consists of a plurality of the monitor subjects to be monitored in ones of the cycles which are shorter and close to each other. The microcomputer also computes a value as a function of the computed values associated with the first group and outputs a combination of the computed value and an expected value thereof in the form of a first data signal with an identifier and a combination of the computed value associated with the second group and the expected value thereof in the form of a second data signal with an identifier. The monitor module analyzes the identifiers and dispatches the first and second data signals to the higher speed and lower speed digital circuits, respectively. The higher speed digital circuit works to determine whether the computed value and the expected value carried by the first data signal are coincident with each other or not to determine whether the controller monitor is operating properly or not. The lower speed digital circuit works to determine whether the computed value and the expected value carried by the second data signal are coincident with each other to determine whether the controller monitor is operating properly or not.

The microcomputer may produce the sum of the computed values associated with the first group and transmit the sum and an expected value thereof to the monitor module in the form of the first data signal. The monitor module determines through the higher speed digital circuit whether the sum is coincident with the expected value or not to determine whether the controller monitor is operating properly or not.

The preselected monitor subjects to be monitored by the controller monitor may alternatively be one of (1) data which is stored in a data RAM installed in the microcomputer as a value computed by the actuator controller, (2) a fixed value which is a value derived by computing a simulation data in the actuator controller, (3) an order in which functions are read out by the actuator controller, and (4) a value computed by the actuator controller based on the input signal indicating the parameter associated with the preselected operation of the vehicle and a control program which is stored in a read-only memory installed in the microcomputer and to be executed by the actuator controller.

According to the second aspect of the invention, there is provided an electronic control apparatus for a vehicle which comprises: (a) a microcomputer including an actuator controller and a controller monitor, the actuator controller working to control an operation of an actuator mounted in a vehicle in response to an input signal indicating a parameter associated with a preselected operating condition of the vehicle, the controller monitor working to monitor validity of a preselected monitor subject associated with an operation of the actuator controller to determine whether the actuator controller is operating properly or not, the microcomputer outputting a value that is computed by the microcomputer and associated with the validity of the preselected monitor subject; and (b) a monitor module including a digital circuit which is designed to monitor whether the controller monitor is operating properly or not based on comparison between the computed value, as inputted from the microcomputer, and an expected value of the computer value, as stored in the monitor module.

In the preferred mode of the invention, the microcomputer may modify the computed value so as to match the expected value stored in the monitor module and outputs the modified computed value to the monitor module.

The actuator may be a motor serving to control a position of a throttle valve. When it is determined that the controller monitor is malfunctioning, the microcomputer cuts a supply of power to the motor through a motor driver and at least one of the controller monitor and the monitor module.

According to the third aspect of the invention, there is provided an electronic control apparatus for a vehicle which comprises: (a) a microcomputer including an actuator controller and a controller monitor, the actuator controller working to control an operation of an actuator mounted in a vehicle in response to an input signal indicating a parameter associated with a preselected operating condition of the vehicle, the controller monitor working to monitor validities of preselected monitor subjects associated with an operation of the actuator controller to determine whether the actuator controller is operating properly or not, the microcomputer computing values that are associated with the validities of the preselected monitor subjects, respectively, and breaking down the monitor subjects at least into a first and a second group according to modes of monitoring of the monitor subjects, at least the first group consisting of a plurality of the monitor subjects, the microcomputer also computing a value as a function of the computed values associated with the validities of the first group of the monitor subjects and outputting a combination of the computed value and an expected value thereof in the form of a first data signal with an identifier and a combination of the computed value associated with the second group and the expected value thereof in the form of a second data signal with an identifier; and (b) a monitor module which analyzes the identifiers of the first and second data signals, as inputted from the microcomputer, and dispatches the first and second data signals to a first and a second digital circuit installed in the monitor module, respectively, to determine whether the actuator controller is operating properly or not based on comparison between the computed values and the expected values carried by the first and second data signals.

In the preferred mode of the invention, the modes of monitoring of the monitor subjects may be modes of the comparison between the computed values and the expected values. The computed value carried by one of the first and second data signals is to be determined by one of the first and second digital circuits of the monitor module whether the computed value is coincident with the expected value or not to determine whether the controller monitor is operating properly or not. The computed value carried by the other of the first and second data signals is to be determined by the other of the first and second digital circuits of the monitor module whether the computed value is greater than the expected value or not to monitor whether the controller monitor is operating properly or not.

The microcomputer produces the sum of the computed values associated with the first group as the value computed as a function of the computed values associated with the first group and transmits the sum and an expected value thereof to the monitor module in the form of the first data signal. The monitor module determines through the first digital circuit whether the sum is coincident with the expected value or not to determine whether the controller monitor is operating properly or not.

The monitor subjects to be monitored by the controller monitor may be two of (1) a control program which is stored in a read-only memory installed in the microcomputer and to be executed by the actuator controller, (2) data which is stored in a data RAM installed in the microcomputer as a value computed by the actuator controller, (3) a fixed value which is a value derived by computing a simulation data in the actuator controller, (4) an order in which functions are read out by the actuator controller, and (5) a value computed by the actuator controller based on the input signal indicating the parameter associated with the preselected operation of the vehicle.

The controller monitor may work to monitor the validities of the monitor subjects in cycles. A difference in the mode of monitoring between the first and second groups may be a difference in value of the cycles. The cycles of the first group of the monitor subjects is shorter than the cycle of the second group. The monitor module may include a higher speed digital circuit that is the first digital circuit and a lower speed digital circuit that is the second digital circuit. The higher speed digital circuit works to compare between the computed value and the expected value carried by the first data signal. The lower speed digital circuit works to compare between the computed value and the expected value carried by the second data signal.

The microcomputer produces the sum of the computed values associated with the first group as the value computed as a function of the computed values associated with the first group and transmits the sum and an expected value thereof to the monitor module in the form of the first data signal. The monitor module determines through the higher speed digital circuit whether the sum is coincident with the expected value or not to determine whether the controller monitor is operating properly or not.

The preselected monitor subjects to be monitored by the controller monitor may alternatively be one of (1) data which is stored in a data RAM installed in the microcomputer as a value computed by the actuator controller, (2) a fixed value which is a value derived by computing a simulation data in the actuator controller, (3) an order in which functions are read out by the actuator controller, and (4) a value computed by the actuator controller based on the input signal indicating the parameter associated with the preselected operation of the vehicle and a control program which is stored in a read-only memory installed in the microcomputer and to be executed by the actuator controller.

The microcomputer transmits the first and second data signals to the monitor module while at the same time, determining whether the actuator controller is operating properly or not.

When a period of time in which the computed value continues to be different from the expected value exceeds a predetermined time, each of the first and second digital circuits of the monitor module determines that the controller monitor is malfunctioning.

Each of the first and second digital circuits of the monitor module may be equipped with a data error counter which counts up in response to input from a plurality of clocks, as used to determine a reference speed at which the first and second digital circuits operate and is cleared upon agreement of the computed value with the expected value. Each of the first and second digital circuits determines that the period of time in which the computed value continues to be different from the expected value has exceeded the predetermined time when a count value of a corresponding one of the data error counters exceeds a preselected value.

When a period of time in which the computed value and the expected value have failed to be received by the monitor module exceeds a preselected time, each of the first and second digital circuits of the monitor module determines that the controller monitor is malfunctioning.

Each of the first and second digital circuits of the monitor module may be equipped with a communication error counter which counts up in response to input from a plurality of clocks, as used to determines a reference speed at which the first and second digital circuits operate and is cleared upon reception of a corresponding one of the first and second data signals. When a count value of the communication error counter exceeds a preselected value, a corresponding one of the first and second digital circuits determines that the communication with the microcomputer is failing.

The monitor module may also be equipped with a reference counter which counts up in response to input of each of the clocks. The microcomputer may also include a module monitor designed to analyze a count value of the reference counter to determine whether the monitor module is operating properly or not.

The module monitor works to sample the count value of the reference counter cyclically and determines that the monitor module is malfunctioning when a period of time in which the count value continues to be unchanged exceeds a preselected time.

The actuator may be a motor serving to control a position of a throttle valve. When it is determined that the controller monitor is malfunctioning, the microcomputer cuts a supply of power to the motor through a motor driver and at least one of the controller monitor and the monitor module.

BRIEF DESCRIPTION OF THE DRAWINGS

The present invention will be understood more fully from the detailed description given hereinbelow and from the accompanying drawings of the preferred embodiments of the invention, which, however, should not be taken to limit the invention to the specific embodiments but are for the purpose of explanation and understanding only.

In the drawings:

FIGS. 7, 8, 9, 10, and 11 are flowcharts of control steps to transmit results of computation and expected values, as used in the five-subject monitoring mode, to a monitor module;

FIG. 12 is a view which shows a structure of a signal to be outputted from a microcomputer to a monitor module of the electronic control system of FIG. 1;

DESCRIPTION OF THE PREFERRED EMBODIMENTS

Figure 1:
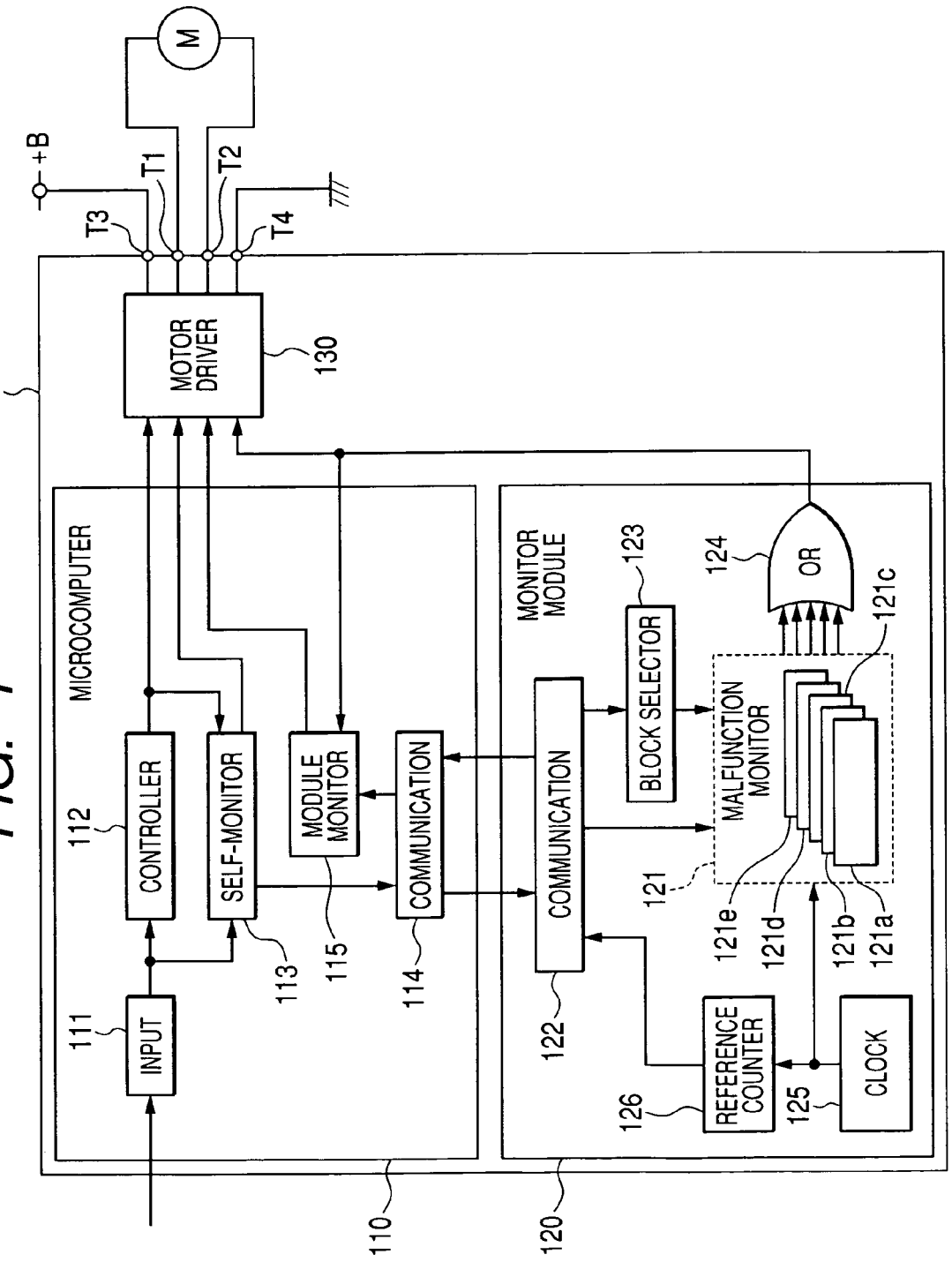
FIG. 1 is a block diagram which shows an electronic control system according to the first embodiment of the invention.

Referring to the drawings, wherein like reference numbers refer to like parts in several views, particularly to FIG. 1, there is shown an electronic control system 100 according to the first embodiment of the invention.

The electronic control system 100 consists essentially of a microcomputer 110, a monitor module 120, and a driver circuit 130 and is designed to control an operation of an electric motor 500 through output terminals T1 and T2 which works to actuate, for example, a throttle valve for an automotive engine (not shown). The electronic control system 100 and the motor 500 are supplied with electric power from a vehicle-mounted storage battery through a power supply terminal T3 and a ground terminal T4.

The microcomputer 110 works to perform a variety of logical operations to control the driving of the motor 500 and includes functional blocks, as illustrated in FIG. 1.

Specifically, the microcomputer 100 consists of an input circuit 111, a controller 112, a self-monitor 113, a communication circuit 114, and a module monitor 115. In a motor control mode to control the operation of the motor 500, the controller 112 monitors a signal indicative of, for example, a stroke or effort of an accelerator pedal of the vehicle which is inputted to the microcomputer 110 through the input circuit 111 and calculates a controlled variable of the motor 500 which indicates a target position (i.e., a target amount of opening) of the throttle valve. The controller 112 then outputs a drive command indicative of the controlled variable to the driver circuit 130. The driver circuit 130 is responsive to the drive command to control the operation of the motor 500 to bring the position of the throttle valve into agreement of the target one.

The self-monitor 113 works to monitor the operation of the controller 112 to determine whether the controller 112 is operating properly or not. Specifically, the self-monitor 113 determines indirectly whether the controller 112 is functioning properly or not by monitoring five subjects, as will be described below, which are used directly or indirectly by the controller 112 in controlling the operation of the motor 500 (i.e., the throttle valve) and ensure the validity of the operation of the controller 112.

Monitoring of Program Memory (ROM Check)

Figure 2:
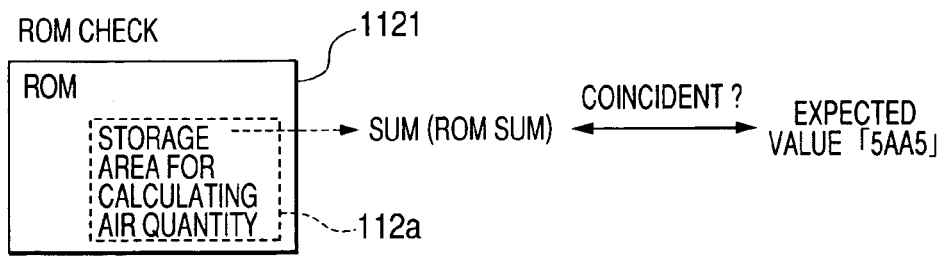
FIG. 2 is a view which shows a ROM installed in the electronic control system of FIG. 1 which is to be monitored in the validity thereof.

The self-monitor 113 is designed to monitor the correctness or validity of various control programs which are to be executed in the controller 112 and stored in a read-only memory (ROM) 1121, as illustrated in FIG. 2, built in the microcomputer 110 or the validity of control data used in the control programs. For instance, such monitoring (i.e., ROM check) is achieved in the following manner.

In storage area (i.e., ROM area) 112a of the program memory 1121, as illustrated in FIG. 2, control parameters used in calculating the controlled variable for the throttle valve are so arrayed that the sum of them will be a fixed value (e.g., 5AA5). The self-monitor 113 first adds the control parameters stored in the ROM area 112a of the program memory 1121 together and compares the sum with a correct or expected value (e.g., 5AA5) retained in a memory. If the sum is not coincident with the expected value, the self-monitor determines that the controller 112 is failing to produce the drive command (i.e., the controlled variable of the throttle valve).

Monitoring of Data RAM (RAM Check)

The self-monitor 113 also works to monitor the validity of data, such as a duty cycle of a signal (i.e., the drive command) indicative of the amount of opening of the throttle valve, which has been computed by the controller 112 and stored in a data RAM built in the microcomputer 110. For example, such monitoring (i.e., RAM check) is achieved in the following manner.

Figure 3A:
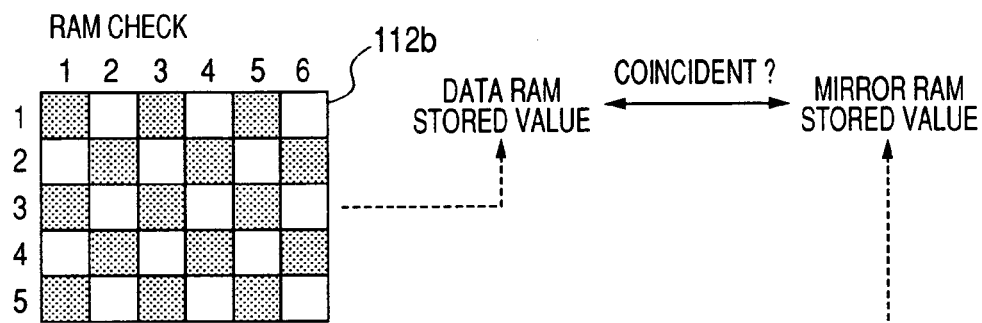
FIG. 3(a) is an internal structure of a RAM installed in the electronic control system of FIG. 1.
Figure 3B:
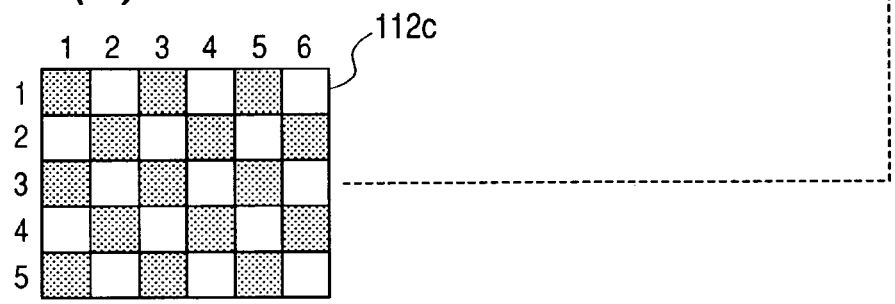
FIG. 3(b) is an internal structure of a mirror RAM.

The controller 112 is designed so that each time a result of computation (i.e., the drive command) is derived, it is retained, as illustrated in FIGS. 3(a) and 3(b), in a storage area 112c of a mirror RAM built in the microcomputer 110 as well as the storage area 112b of the data RAM. The self-monitor 113 samples data (i.e., the result of computation) out of a selected one of addresses in the data RAM and data (i.e., an expected value) out of a corresponding one of addresses or the same address in the mirror RAM and compares them to determine whether the data in the data RAM is coincident with that in the mirror RAM or not. If not, the self-monitor 113 determines that the controller 112 is failing to produce the drive command to be outputted to the driver circuit 130.

Monitoring of Instruction Operation in Controller (Instruction Check)

The self-monitor 113 also works to monitor the validity of an instruction operation of the controller 112 which produces a command (i.e., the drive command) to be outputted to the driver circuit 130 and related parts, such as a register, an address bus, and a data bus used in the instruction operation, in the microcomputer 110. For instance, such monitoring (i.e., instruction check) is achieved in the following manner.

Figure 4:
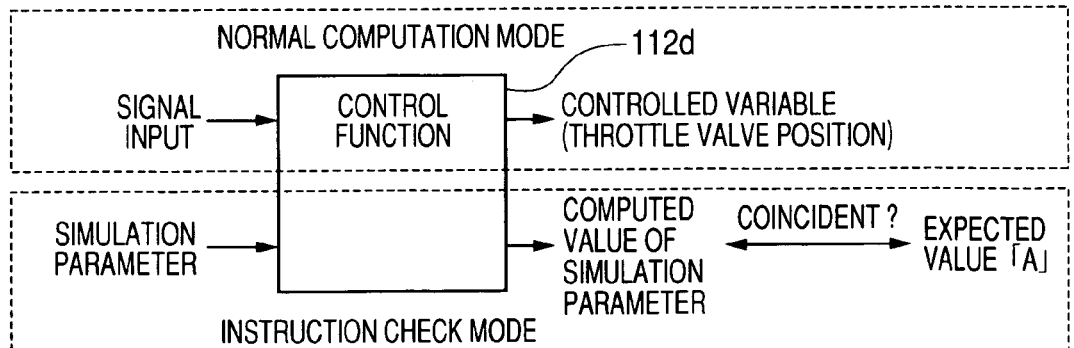
FIG. 4 is a view which shows an instruction check performed by the electronic control system of FIG. 1.

The controller 112, as described above, works to compute the target position of the throttle valve based on the signal (e.g., a stroke of the accelerator pedal of the vehicle) inputted through the input circuit 111. The controller 112 includes a control function 112d, as illustrated in FIG. 4, which works to sample a simulation parameter (i.e., a dummy of the input signal), as pre-stored in a memory as a fixed value, perform a given operation (i.e., algorithm used to compute the target position of the throttle valve) on the simulation parameter, and retain it in a register. The self-monitor 113 determines that a result of the operation on the simulation parameter stored in the register is coincident with an expected value A, as stored in a memory, or not to analyze the correctness or validity of the instruction operation of the controller 112. If not, the self-monitor 113 determines that the controller 112 is failing to produce the drive command to be outputted to the driver circuit 130.

Monitoring of Call Order of Functions (Flow Check)

The self-monitor 113 also works to monitor the order in which the controller 112 fetches mathematical schemes or functions. For example, such monitoring is achieved in the following manner.

Figure 5:
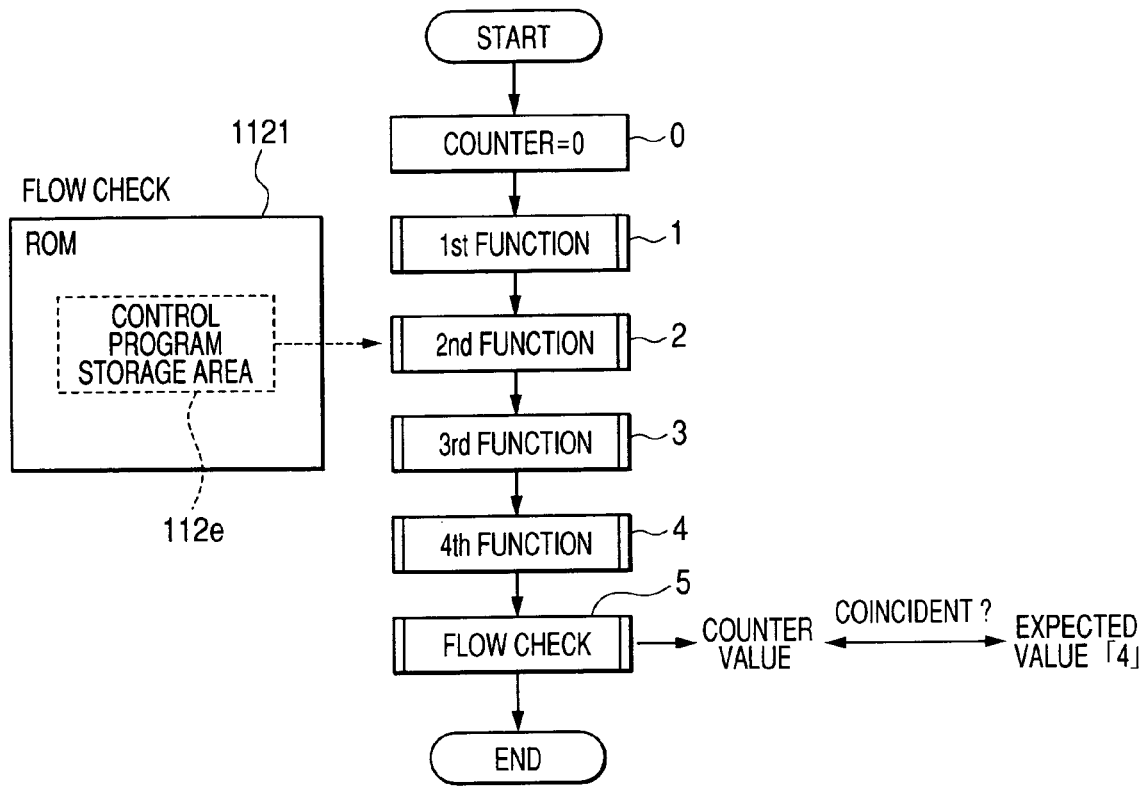
FIG. 5 is a view which shows a flowchart installed in the electronic control system of FIG. 1 which is subjected to a flow check.

The program memory 1121 of the microcomputer 110 stores a sequence of logical steps or control program, as illustrated in FIG. 5, in a storage area 112e. The control program specifies the sequence in which a first, a second, a third, and a fourth function are required to be fetched by the controller 112 through a flow of steps 1, 2, 3, and 4. In the control program, step 0 is executed prior to steps 1 to 4 to reset a count value of a program counter to zero (0). After each execution of step 4, the count value of the program counter is incremented in step 5. Additionally, the self-monitor 113 makes in step 5 a flow check of whether the order in which the first to fourth functions have been called is correct or not. Specifically, the self-monitor 113 compares with the counter value of the program counter with an expected value of, for example, four (4), as stored in a memory to determine whether the call order of the functions is correct or not. Specifically, the self-monitor 113 determines whether the count value is coincident with the expected value or not. If not, it is determined that the controller 112 is failing to produce the drive command to be outputted to the driver circuit 130.

Monitoring of Value Computed in Controller (System Check)

The self-monitor 113 also works to monitor a value, such as the duty cycle of the throttle valve indicative of a target amount of opening thereof, computed by the controller 112 based on a signal inputted through the input circuit 111. For example, such monitoring (i.e., system check) is achieved in the following manner.

Figure 6:
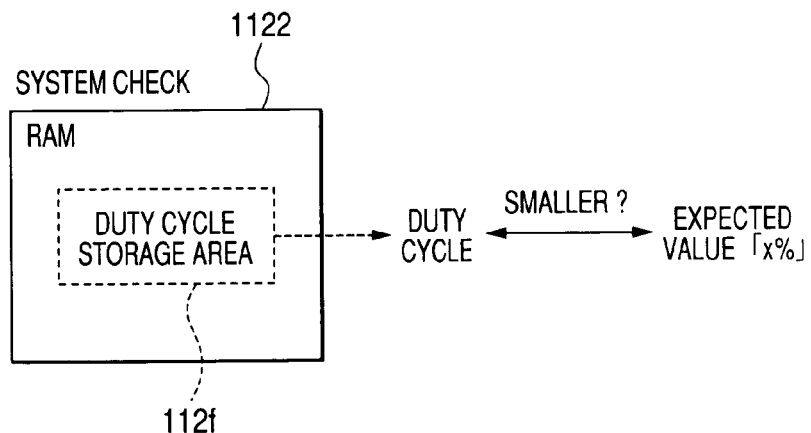
FIG. 6 is a view which shows a RAM installed in the electronic control system of FIG. 1 which is to be monitored in the validity thereof.

The microcomputer 110 is designed to store in an internal memory (not shown) a computed value of the duty cycle of the throttle valve and a map M listing relations between open angles of the throttle valve and operating conditions (e.g., the position of the accelerator pedal and/or the gear position of the transmission) of the vehicle in terms of target duty cycles of the throttle valve. The controller 112 works to calculate a target value of the duty cycle of the throttle valve as a function of an instant value of the signal inputted through the input circuit 111 indicating the operating condition of the vehicle using the map M and stores it, as illustrated in FIG. 6, in a duty cycle storage area 112f of the data RAM 1122.

The self-monitor 113 samples the duty cycle, as calculated by the controller 112 and stored in the storage area 112f, calculates an upper limit (x %) of the duty cycle, which is defined to have a predetermined relation to the duty cycle, using the map M according to a given algorithm, and defines the upper limit as an expected value, and compares the value of the duty cycle with the expected value. Specifically, the self-monitor 113 determines whether the value of the duty cycle is less than the expected value or not. If not, it is determined that the controller 112 is failing to produce the drive command to be outputted to the driver circuit 130.

The map M may alternatively be prepared to list permissible upper limits of the duty cycle of the throttle valve. The controller 112 may calculate a target value of the duty cycle of the throttle valve according to a given algorithm using an instant value of the signal inputted through the input circuit 111. The self-monitor 113 may sample, as the expected value, one of the upper limits from the map M which corresponds to the target value of the duty cycle and determine whether the value of the duty cycle is less than the expected value or not.

The self-monitor 113 is designed to monitor the above five subjects separately and, upon completion of monitoring of each subject, output to the driver circuit 130 the monitored result in the form of an information signal indicative of the validity of the drive command, as produced by the controller 112. Specifically, if the result of computation in each of the ROM check, the RAM check, the instruction check, and the flow check does not match the expected value, the self-monitor 113 outputs the information signal representing the invalidity of the drive command, as produced by the controller 112, to the driver circuit 130. In the system check, if the result of computation is greater than the expected value, the self-monitor 113 outputs the information signal representing the invalidity of the drive command, as produced by the controller 112, to the driver circuit 130. Use of such an information signal, as will be described later in detail, results in improved reliability in controlling the operation of the throttle valve through the motor 500.

Upon completion of monitoring of the above five monitored subjects, the self-monitor 113 stores the result of computation and the expected value in each of the five monitored subjects, i.e., the ROM check, the RAM check, the instruction check, the flow check, and the system check in a memory. The self-monitor 113 also records in a memory monitor completion flags each of which represents the completion of one of the monitoring operations on the above five monitored subjects.

The communication circuit 114 of the microcomputer 110 works to transmit or receive information to or from a communication circuit 122 of the monitor module 120. Specifically, the communication circuit 114 transmits the results of computation in the self-monitor 113 and the expected values to the monitor module 120 through the communication circuit 122.

FIGS. 7 to 11 are flowcharts of control steps to be executed by the communication circuit 114 to transmit the results of computation and the expected values, as used in the five-subject monitoring mode, to the monitor module 120. Such data are outputted from the communication circuit 114 to the communication circuit 122 through serial communication or parallel communication. When it is required to output the data, as produced in the five-subject monitoring mode, but another data is now being transmitted, the communication circuit 114 performs time-sharing to delay the transmission of the data produced in the five-subject monitoring mode.

FIG. 7 shows a transmission control program to transmit the result of computation and the expected value, as used in the monitoring of the program memory (i.e., ROM check), to the monitor module 120. This program is executed at regular intervals.

After entering the program, the routine proceeds to step 11 wherein it is determined whether the monitor completion flag indicating the completion of monitoring of the program memory (i.e., ROM check) is set by the self-monitor 113 or not. If a YES answer is obtained meaning that the program memory is finished to be monitored, then the routine proceeds to step 12.

In step 12, the result of computation (i.e., ROM sum), as illustrated in FIG. 2, and the expected value of, for example, 5AA5 are read out of the memory and held in a first register (not shown) installed in the microcomputer 110 as transmit data to be transmitted to the monitor module 120. If there is already data in the first register, it is updated. The transmit data is prepared to have a frame structure, as illustrated in FIG. 12. Specifically, the transmit data has an identifier (ID) representing that this data is data on the ROM check.

The routine proceeds to step 13 wherein the transmit data, as prepared in step 12, is outputted to the monitor module 120. The routine proceeds to step 14 wherein the monitor completion flag indicating the completion of the ROM check is reset or cleared.

If a NO answer is obtained in step 11 meaning that the ROM check is not yet finished, then the routine proceeds directly to step 13. Specifically, the communication circuit 114 transmits the data to the monitor module 120 again which is retained in the first register and has already been transmitted in a previous program cycle. Subsequently, the communication circuit 114 resets in step 14 the monitor completion flag indicating the completion of the ROM check.

FIG. 8 shows a second transmission control program to transmit the result of computation and the expected value, as used in the monitoring of the data RAM (i.e., RAM check), to the monitor module 120. This program is executed at regular intervals.

After entering the program, the routine proceeds to step 21 wherein it is determined whether the monitor completion flag indicating the completion of monitoring of the data RAM (i.e., RAM check) is set by the self-monitor 113 or not. If a YES answer is obtained meaning that the RAM check has been completed, then the routine proceeds to step 22.

In step 22, the result of computation (i.e., the value stored in the data RAM), as illustrated in FIG. 3, and the expected value (i.e., the value stored in the mirror RAM) are searched and held in a second register (not shown) installed in the microcomputer 110 as transmit data to be transmitted to the monitor module 120. If there is already data in the second register, it is updated. The transmit data is prepared to have the frame structure in FIG. 12. Specifically, the transmit data has an identifier (ID) representing that this data is data on the RAM check.

The routine proceeds to step 23 wherein the transmit data, as prepared in step 22, is outputted to the monitor module 120. The routine proceeds to step 24 wherein the monitor completion flag indicating the completion of the RAM check is reset or cleared.

If a NO answer is obtained in step 21 meaning that the RAM check is not yet finished, then the routine proceeds directly to step 23. Specifically, the communication circuit 114 transmits the data to the monitor module 120 again which is retained in the second register and has already been transmitted in a previous program cycle. Subsequently, the communication circuit 114 resets in step 24 the monitor completion flag indicating the completion of the RAM check.

FIG. 9 shows a third transmission control program to transmit the result of computation and the expected value, as used in the monitoring of the instruction operation of the controller 112 (i.e., instruction check). This program is executed at regular intervals.

After entering the program, the routine proceeds to step 31 wherein it is determined whether the monitor completion flag indicating the completion of monitoring of the instruction operation of the controller 112 (i.e., instruction check) is set by the self-monitor 113 or not. If a YES answer is obtained meaning that the instruction check has been completed, then the routine proceeds to step 32.

In step 32, the result of computation on the simulation data and the expected value A are read out of the memory and held in a third register (not shown) installed in the microcomputer 110 as transmit data to be transmitted to the monitor module 120. If there is already data in the second register, it is updated. The transmit data is prepared to have the frame structure in FIG. 12. Specifically, the transmit data has an identifier (ID) representing that this data is data on the instruction check.

The routine proceeds to step 33 wherein the transmit data, as prepared in step 32, is outputted to the monitor module 120. The routine proceeds to step 34 wherein the monitor completion flag indicating the completion of the instruction check is reset or cleared.

If a NO answer is obtained in step 31 meaning that the instruction check is not yet finished, then the routine proceeds directly to step 33. Specifically, the communication circuit 114 transmits the data to the monitor module 120 again which is retained in the third register and has already been transmitted in a previous program cycle. Subsequently, the communication circuit 114 resets in step 34 the monitor completion flag indicating the completion of the instruction check.

FIG. 10 shows a fourth transmission control program to transmit the result of computation and the expected value, as used in the monitoring of the call order of the functions (i.e., flow check), to the monitor module 120. This program is executed at regular intervals.

After entering the program, the routine proceeds to step 41 wherein it is determined whether the monitor completion flag indicating the completion of monitoring of the call order of the functions (i.e., flow check) is set by the self-monitor 113 or not. If a YES answer is obtained meaning that the flow check has been completed, then the routine proceeds to step 42.

In step 42, the counter value of the program counter and the expected value (e.g., 4) are read out of the memory and held in a fourth register (not shown) installed in the microcomputer 110 as transmit data to be transmitted to the monitor module 120. If there is already data in the second register, it is updated. The transmit data is prepared to have the frame structure in FIG. 12. Specifically, the transmit data has an identifier (ID) representing that this data is data on the flow check.

The routine proceeds to step 43 wherein the transmit data, as prepared in step 42, is outputted to the monitor module 120. The routine proceeds to step 44 wherein the monitor completion flag indicating the completion of the flow check is reset or cleared.

If a NO answer is obtained in step 41 meaning that the flow check is not yet finished, then the routine proceeds directly to step 43. Specifically, the communication circuit 114 transmits the data to the monitor module 120 again which is retained in the fourth register and has already been transmitted in a previous program cycle. Subsequently, the communication circuit 114 resets in step 44 the monitor completion flag indicating the completion of the flow check.

FIG. 11 shows a fifth transmission control program to transmit the result of computation and the expected value, as used in the monitoring of the value computed by the controller 112, to the monitor module 120. This program is executed at regular intervals.

After entering the program, the routine proceeds to step 51 wherein it is determined whether the monitor completion flag indicating the completion of monitoring of the value computed by the controller 112 (i.e., system check) is set by the self-monitor 113 or not. If a YES answer is obtained meaning that the system check has been completed, then the routine proceeds to step 52.

In step 52, the value computed (i.e., the duty cycle), as illustrated in FIG. 6, and the expected value (%) are read out of the memory and held in a fifth register (not shown) installed in the microcomputer 110 as transmit data to be transmitted to the monitor module 120. If there is already data in the second register, it is updated. The transmit data is prepared to have the frame structure in FIG. 12. Specifically, the transmit data has an identifier (ID) representing that this data is data on the system check.

The routine proceeds to step 53 wherein the transmit data, as prepared in step 52, is outputted to the monitor module 120. The routine proceeds to step 54 wherein the monitor completion flag indicating the completion of the system check is reset or cleared.

If a NO answer is obtained in step 51 meaning that the system check is not yet finished, then the routine proceeds directly to step 53. Specifically, the communication circuit 114 transmits the data to the monitor module 120 again which is retained in the fifth register and has already been transmitted in a previous program cycle. Subsequently, the communication circuit 114 resets in step 54 the monitor completion flag indicating the completion of the system check.

As apparent from the above discussion, the communication circuit 114 works to transmit combinations of the results of computation on the five monitored subjects and the expected values, as used in the monitoring operations of the self-monitor 113, to the monitor modules 120. The monitor module 120, as will be described in detail later, analyzes the input data and determines whether the self-monitor 113 is operating normally or not. Specifically, the monitoring of the controller 112 by the self-monitor 113 and the monitoring of the self-monitor 113 by the monitor module 120 are performed in parallel. This results in improved reliability in controlling the operation of the throttle valve.

The module monitor 115 of the microcomputer 110 works to analyze the information transmitted from the monitor module 120 through the communication circuit 114 to determine whether the monitor module 120 is operating properly or not. The details of the module monitor 115 will be described later.

The monitor module 120 is implemented by a separate IC and designed to analyze the information transmitted from the microcomputer 110 to determine whether the self-monitor 113 is malfunctioning or not. Specifically, the monitor module 120, as described above, receives the data of the structure, as illustrated in FIG. 12, transmitted from the microcomputer 110 through the communication circuit 122, picks up the result of computation and the expected value therefrom, and inputs them into a malfunction monitor 121. The malfunction monitor 121 compares the result of computation with the expected value and determines whether the self-monitor 113 is malfunctioning or not. The malfunction monitor 121, as described later in detail, operates on clocks, as produced by a clock generator 125.

The malfunction monitor 121 consists essentially of five digital circuit blocks 121a, 121b, 121c, 121d, and 121e each of which is designed to analyze one of the above five monitored subjects and decide whether the self-monitor 113 is malfunctioning or not.

The monitor module 120 also includes a block selector 123, a reference counter 126, and an OR circuit 124. The block selector 123 works to analyze the identifier added to each of the data inputted to the communication circuit 122 and input the result of computation and the expected value contained in the data into a corresponding one of the digital circuit blocks 121a to 121e for comparison therebetween.

Figure 13:
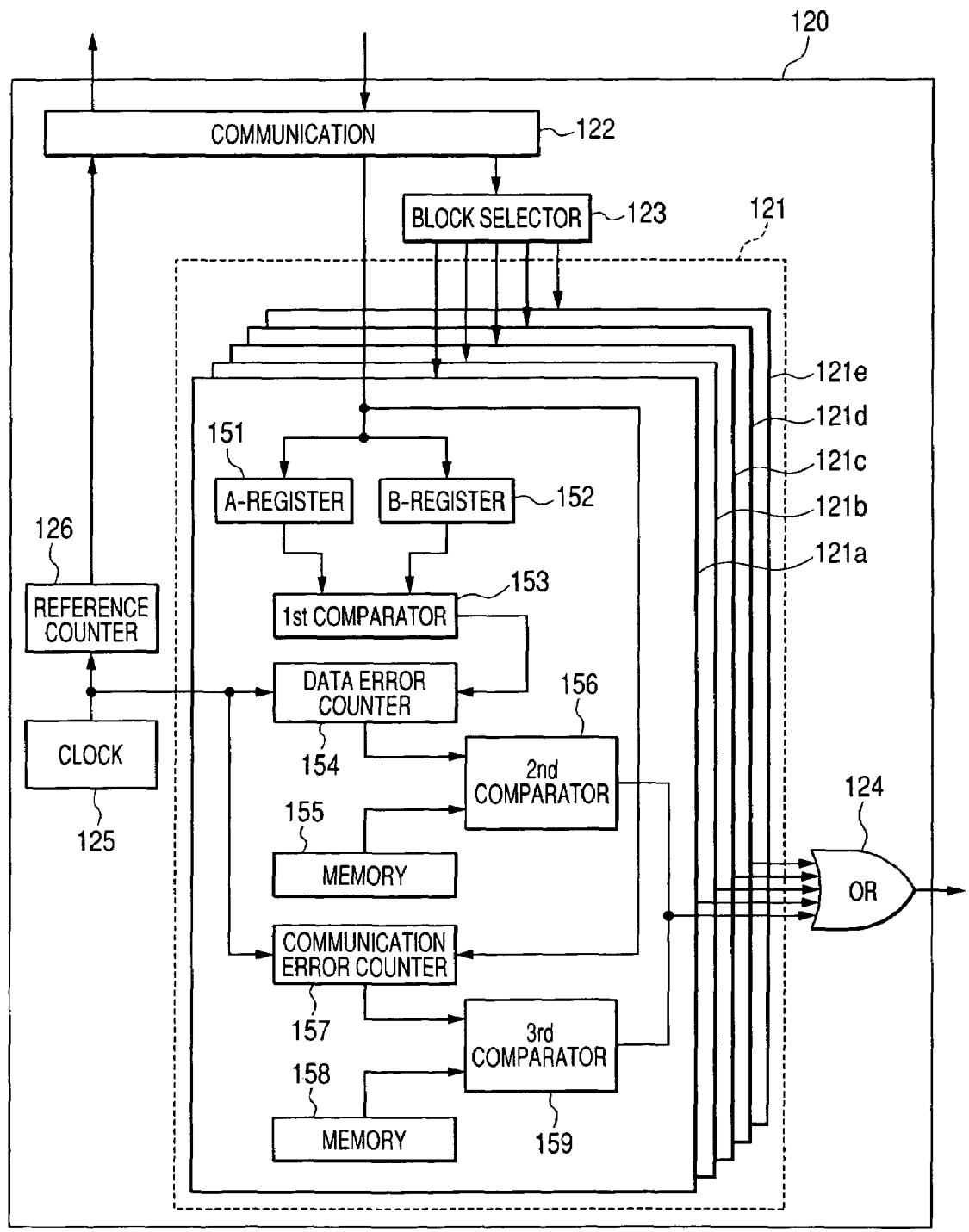
FIG. 13 is a block diagram which shows a digital circuit block installed in a monitor module of the electronic control system of FIG. 1.

FIG. 13 is a circuit diagram which shows an internal structure of the digital circuit block 121a of the malfunction monitor 121.

For instance, when the block selector 123 analyzes the identifier added to the data inputted from the communication circuit 122 and inputs the result of computation (will also be referred to as a computed value below) and the expected value contained in the input data into the digital circuit block 121a, as specified by the identifier, the digital circuit block 121a first stores the computed value and the expected value in an A register 151 and a B register 152, respectively. A first comparator 153 fetches the computed value and the expected value from the A register 151 and the B register 152 and compares them. Specifically, the first comparator 153 is designed to determine whether the ROM sum, as illustrated in FIG. 2, matches the expected value of, for example, 5AA5 or not to determine whether the ROM check has been properly completed by the self-monitor 113 or not.

In order to prevent the digital circuit block 121a from determining in error that the monitoring operation of the microcomputer 110 is failing which arises from an accidental incoincidence between the computed value and the expected value, the digital circuit block 121a also includes a data error counter 154 and a second comparator 156. The data error counter 154 is responsive to input of each clock from the clock generator 125 to count up and cleared upon input of a signal from the first comparator 153 which indicates that the computed value matches the expected value. The second comparator 156 works to compare the count value of the data error counter 154 with a reference value, as stored in a memory 155, and output a result of such comparison as indicating a result of monitoring of the malfunction of the self-monitor 113 from the digital circuit block 121a.

When the count value of the data error counter 154 is greater than the reference value stored in the memory 155, meaning that a period of time in which the computed value continues not to be coincident with the expected value has exceeded a reference period of time, the second comparator 156 determines that the self-monitor 113 is not operating properly.

If the electronic control system 100 is failing in establishing communication between the microcomputer 110 and the monitor module 120, it may cause the monitor module 120 to fail in monitoring the monitoring operation of the microcomputer 110, thus resulting in lowered reliability in controlling the operation of the throttle valve. In order to alleviate this drawback, the digital circuit block 121a is designed to have an additional structure, as discussed below.

The digital circuit block 121a also includes a communication error counter 157 and a third comparator 159. The communication error counter 157 is responsive to input of each clock from the clock generator 125 to count up and cleared in response to an output from the communication circuit 122, as produced each time the communication circuit 122 receives the information from the microcomputer 110. The third comparator 159 works to compare the count value of the communication error counter 157 with a reference value, as stored in a memory 158, and output a result of such comparison as indicating a result of monitoring of the communication between the microcomputer 110 and the monitor module 120 from the digital circuit block 121a.

When the count value of the communication error counter 157 is greater than the reference value stored in the memory 158, meaning that a period of time in which the computed value and the expected value continue not to be received by the monitor module 120 has exceeded a reference period of time, the third comparator 159 determines that the communication between the microcomputer 110 and the monitor module 120 is failing.

Figure 14:
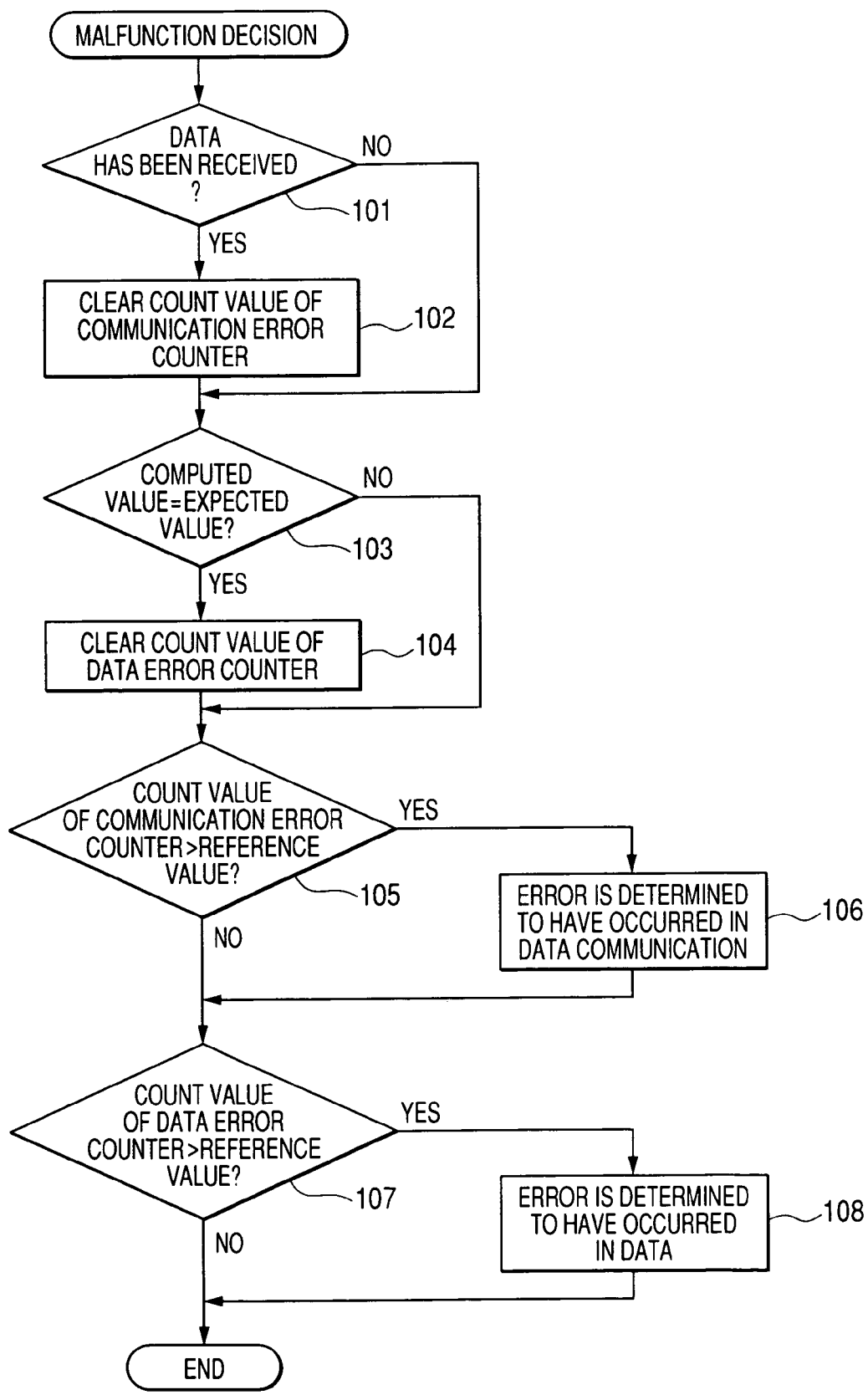
FIG. 14 is a flowchart which shows a malfunction decision program to be executed by digital circuit blocks to monitor errors in communication between a microcomputer and a monitor module and in data, as produced by the microcomputer.

FIG. 14 is a flowchart of a malfunction monitoring program to be executed by the digital circuit block 121a to monitor whether the self-monitor 113 is malfunctioning or not.

After entering the program, the routine proceeds to step 101 wherein it is determined whether the data (i.e., the computed value and the expected value) stored in the registers 151 and 152 have been updated or not. If a NO answer is obtained meaning that the data are not yet updated, then the routine proceeds directly to step 103. Alternatively, if a YES answer is obtained meaning that the data have been updated, then the routine proceeds to step 102 wherein the count value of the communication error counter 157 is cleared to zero (0). The routine proceeds to step 103 wherein it is determined in the first comparator 153 whether the computed value stored in the register 151 is identical with the expected value stored in the register 152 or not. If a NO answer is obtained meaning that the computed value is different from the expected value, then the routine proceeds directly to step 105. Alternatively, if a YES answer is obtained, then the routine proceeds to step 104 wherein the count value of the data error counter 154 is cleared to zero (0).

The routine proceeds to step 105 wherein it is determined, as described above, whether the count value of the communication error counter 157 is greater than the reference value or not. If a NO answer is obtained, then the routine proceeds to step 107. Alternatively, if a YES answer is obtained meaning that a period of time during which the data is not transmitted from the microcomputer 110 to the monitor module 120 is greater than a preselected reference time, then the routine proceeds to step 106 wherein it is determined that the communication between the microcomputer 110 and the monitor module 120 is failing.

In step 107, it is determined whether the count value of the data error counter 154 is greater than the reference value or not. If a YES answer is obtained meaning that a period of time during which the computed value continues not to be coincident with the expected value has exceeded a reference time, then the routine proceeds to step 108 wherein it is determined that the self-monitor 113 is failing in the monitoring operation. If a NO answer is obtained in step 107, then the routine terminates.

The digital circuit blocks 121b, 121c, 121d, and 121e each have the same structure as that of the digital circuit block 121a shown in FIG. 13, which is not illustrated here for the sake of convenience. Specifically, each of the digital circuit blocks 121b to 121e is designed to perform the same logical steps as those in FIG. 14 except as described below. In the following discussion, the same parts of each of the digital circuit blocks 121b to 121e as those of the digital circuit block 121a will be referred to using the same reference numbers as in FIG. 13.

In the digital circuit block 121b, the computed value (i.e., the value stored in the data RAM), as illustrated in FIG. 3, and the expected value (i.e., the value stored in the mirror RAM) are inputted and held in the registers 151 and 152. The first comparator 153 compares those values.

In the digital circuit block 121c, the computed value (i.e., a result of operation on the simulation data) and the expected value of, for example, A are inputted and held in the registers 151 and 152. The first comparator 153 compares those values.

In the digital circuit block 121d, the computed value (i.e., the count value), as illustrated in FIG. 5, and the expected value of, for example, 4 inputted and held in the registers 151 and 152. The first comparator 153 compares those values.

In the digital circuit block 121e, the computed value (i.e., the duty cycle of the throttle valve) and the expected value (i.e., an upper limit of x %) are inputted and held in the registers 151 and 152. The first comparator 153 compares those values.

Figure 15:
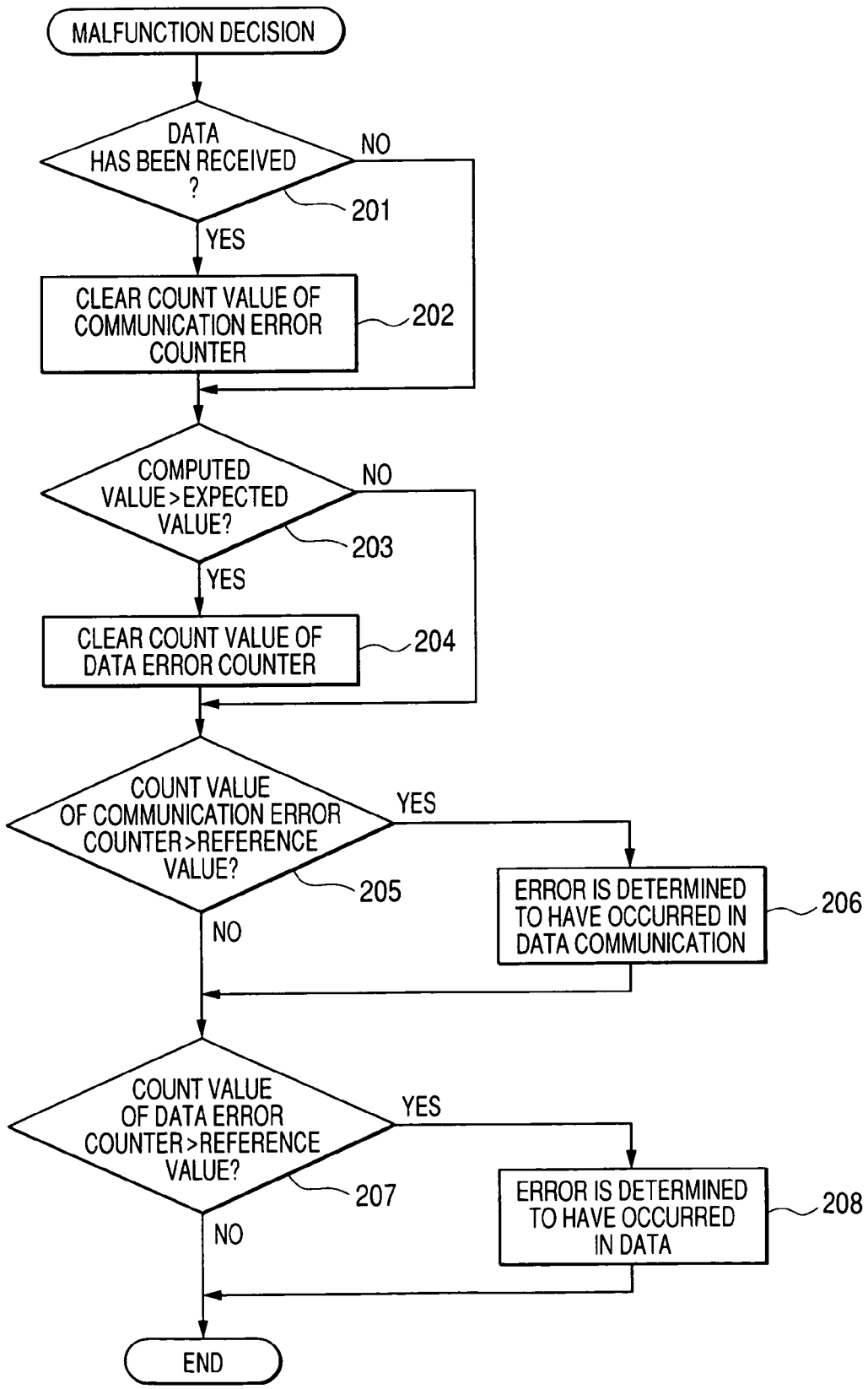
FIG. 15 is a flowchart which shows a malfunction decision program to be executed by a digital circuit block to monitor errors in communication between a microcomputer and a monitor module and in data, as produced by the microcomputer.

FIG. 15 shows is a flowchart of a malfunction monitoring program to be executed by the digital circuit block 121e to decide whether the self-monitor 113 is malfunctioning or not.

After entering the program, the routine proceeds to step 201 wherein it is determined whether the data (i.e., the computed value and the expected value) stored in the registers 151 and 152 have been updated or not. If a NO answer is obtained meaning that the data are not yet updated, then the routine proceeds directly to step 203. Alternatively, if a YES answer is obtained meaning that the data have already been updated, then the routine proceeds to step 202 wherein the count value of the communication error counter 157 is cleared to zero (0). The routine proceeds to step 203 wherein it is determined in the first comparator 153 whether the computed value (i.e., the duty cycle) stored in the register 151 is smaller than or equal to the expected value (i.e., the upper limit x %) stored in the register 152 or not. If a NO answer is obtained meaning that the computed value is greater than the expected value, then the routine proceeds directly to step 205. Alternatively, if a YES answer is obtained, then the routine proceeds to step 204 wherein the count value of the data error counter 154 is cleared to zero (0).

The routine proceeds to step 205 wherein it is determined whether the count value of the communication error counter 157 is greater than the reference value or not. If a NO answer is obtained, then the routine proceeds to step 207. Alternatively, if a YES answer is obtained meaning that a period of time during which the data is not transmitted from the microcomputer 110 to the monitor module 120 is greater than a preselected reference time, then the routine proceeds to step 206 wherein it is determined that the communication between the microcomputer 110 and the monitor module 120 is failing.

In step 207, it is determined whether the count value of the data error counter 154 is greater than the reference value or not. If a YES answer is obtained meaning that a period of time during which the computed value continues not to be coincident with the expected value has exceeded a reference time, then the routine proceeds to step 208 wherein it is determined that the self-monitor 113 is failing in the monitoring operation. If a NO answer is obtained in step 207, then the routine terminates.

Outputs of the second comparator 156 and the third comparator 159 of each of the digital circuit blocks 121a to 121e are inputted, as a result of the decision of the malfunction monitor 121, to the OR circuit 124, as illustrated in FIG. 1. When at least one of the outputs of the digital circuit blocks 121a to 121e indicates that the communication between the microcomputer 110 and the monitor module 120 is failing and/or that the self-monitor 113 is failing in operation thereof, the OR circuit 124 outputs a signal indicative thereof to the driver circuit 130. The driver circuit 130 is, as will be described later in detail, responsive to the input to control the opening or closing of the throttle valve through the motor 500 with a high level of reliability.

The reference counter 126 of the monitor module 120 is designed to count up in response to each input of the clocks from the clock generator 125. The count value of the reference counter 126 is inputted to and monitored by the module monitor 115 of the microcomputer 110 through the communication circuit 114. Specifically, the count value of the reference counter 126 is incremented, like the data error counter 154 and the communication error counter 157 of each of the digital circuit blocks 121a to 121e, in response to each clock outputted from the clock generator 125. This enables the module monitor 115 to monitor indirectly whether the monitor module 120 is failing to monitor the microcomputer 110 or not using the count value of the reference counter 126 which is incremented, like the data error counter 154 and the communication error counter 157. When determining that the monitor module 120 is malfunctioning, the module monitor 115 outputs a signal indicative thereof to the driver circuit 130. This enables the driver circuit 130 to control the opening or closing of the throttle valve through the motor 500 with a high level of reliability.

The module monitor 115 is, as can be seen from FIG. 1, also designed to receive the output from the monitor module 120 (i.e., the OR circuit 124). When the output from the monitor module 120 indicates that the self-monitor 113 is malfunctioning or that the communication from the microcomputer 110 to the monitor module 120 is failing, the module monitor 115 stores such a fact therein and works to place the outputs to the driver circuit 130 in the fail-safe mode.

Figure 16:
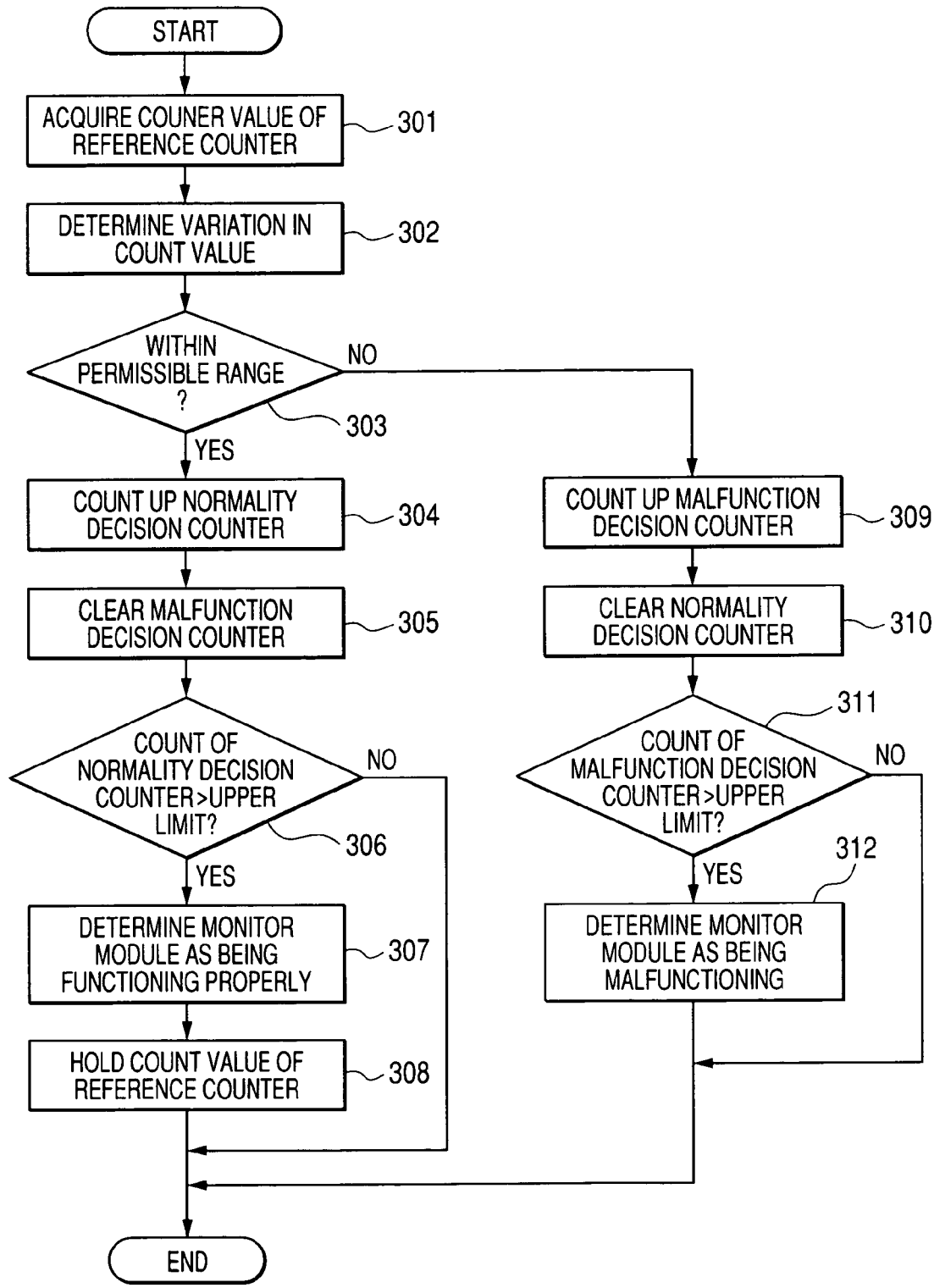
FIG. 16 is a flowchart to be executed by a module monitor of a microcomputer to monitor the malfunction of a monitor module.

FIG. 16 is a flowchart of a malfunction monitoring program to be executed by the module monitor 115 to monitor the malfunction of the monitor module 120. This program is executed at regular intervals.

After entering the program, the routine proceeds to step 301 wherein the count value of the reference counter 126 is received through the communication circuit 122 of the monitor module 120 and the communication circuit 114. The routine proceeds to step 302 wherein the count value of the reference counter 126 which was sampled in one program cycle earlier is read out of a memory, and a difference in the count value between the current program cycle and the last program cycle is determined as a variation in the count value. The routine proceeds to step 303 wherein it is determined whether the count value variation, as derived in step 302, lies within a given permissible range or not.

If a YES answer is obtained in step 303 meaning that the count value variation lies within the permissible range, then the routine proceeds to step 304 wherein a count value of a normality decision counter (not shown) installed in the microcomputer 110 is incremented. The routine proceeds to step 305 wherein a count value of a malfunction decision counter (not shown) installed in the microcomputer 110 is cleared to zero (0). The routine proceeds to step 306 wherein it is determined whether the count value of the normality decision counter is greater than a given upper limit or not. If a YES answer is obtained, then the routine proceeds to step 307 wherein a signal indicating that the monitor module 120 is now functioning properly is outputted to the monitor module 120. The routine proceeds to step 308 wherein the count value of the reference counter 126, as acquired in step 301, is stored in a memory as it is.

If a NO answer is obtained in step 306 meaning that the count value of the normality decision counter is smaller than the upper limit, the module monitor 115 permits the output of the controller 112 to be inputted to the driver circuit 130 as it is and stores the count value of the reference counter 126 in the memory.

If a NO answer is obtained in step 303 meaning that the count value variation is out of the permissible range, then the routine proceeds to step 309 wherein the count value of the malfunction decision counter is incremented. The routine proceeds to step 310 wherein the count value of the normality decision counter is cleared to zero (0). The routine proceeds to step 311 wherein it is determined whether the count value of the malfunction decision counter is greater than a given upper limit or not. If a YES answer is obtained, then the routine proceeds to step 312 wherein a signal indicating that the monitor module 120 is now malfunctioning is outputted to the monitor module 120. The routine proceeds to step 308 wherein the count value of the reference counter 126, as sampled in step 301, is stored in the memory.

Alternatively, if a NO answer is obtained in step 311 meaning that the count value of the malfunction decision counter is less than the upper limit, the module monitor 115 permits the controller 112 to output the drive command to the driver circuit 130 as it is and stores the count value of the reference counter 126 in the memory.

The driver circuit 130 of the electronic control system 100 works to control the opening or closing of the throttle valve through the motor 500.

The driver circuit 130, as described above, receives the outputs from the controller 112, the self-monitor 113, the module monitor 115, and the malfunction monitor 121 and is responsive to one of the outputs which is produced as the drive command by the controller 112 to control the operation of the throttle valve. When the output from the self-monitor 113 indicates the invalidity of the drive command from the controller 112, it means that the reliability of the drive signal inputted to the driver circuit 130 is low. Similarly, when the output from the malfunction monitor 121 indicates that the self-monitor 113 is malfunctioning or when the output from the module monitor 115 indicates that the monitor module 120 is failing in its own monitoring operation, it means that the reliability of the drive signal inputted to the driver circuit 130 is low. Consequently, when receiving any one of such outputs, the driver circuit 130 enters a fail-safe mode to ignore the drive command issued by the controller 112 in favor of safety of the vehicle. Specifically, the driver circuit 130 cuts a supply of power from the battery to the motor 500 through the terminal T3.

Figure 17:
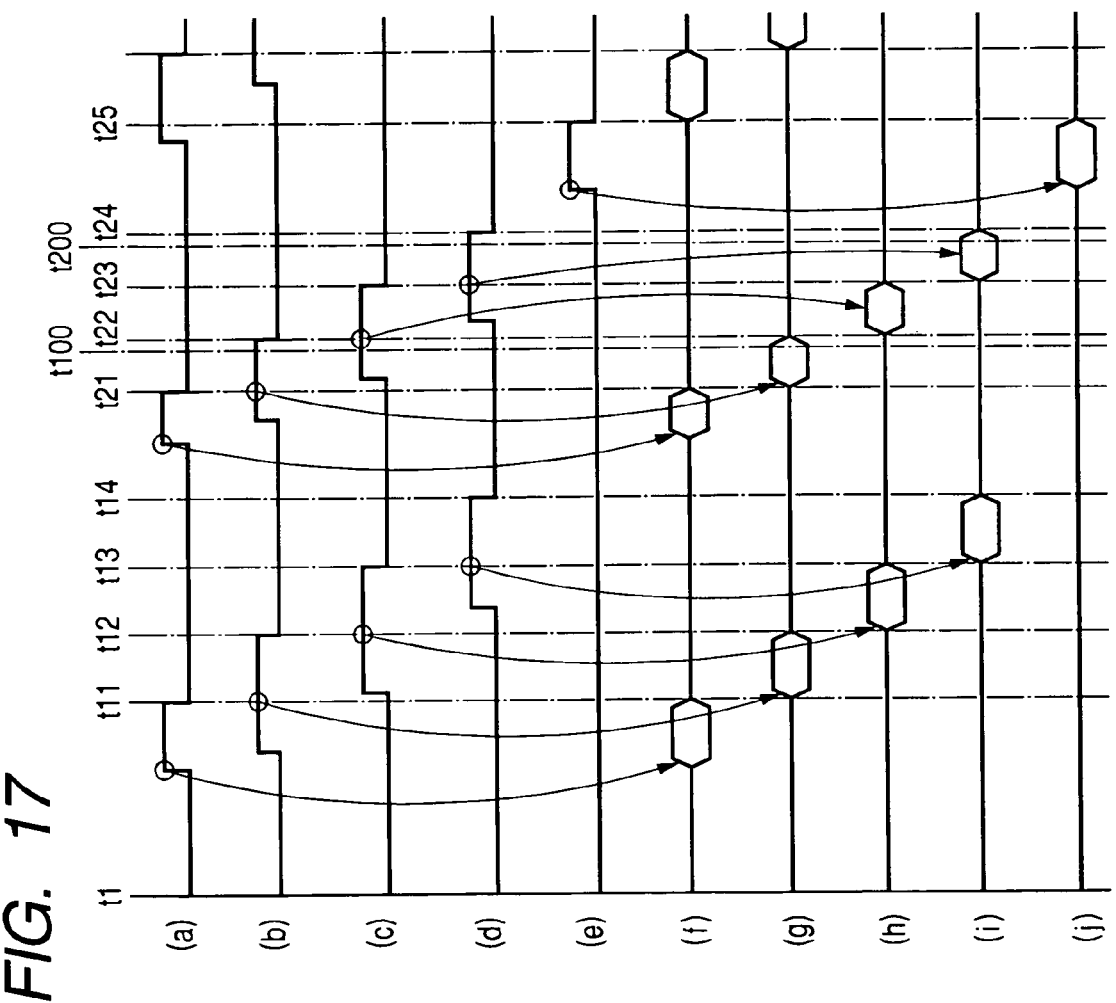
FIGS. 17 and 18 are timecharts which demonstrate operations of the electronic control system of FIG. 1.
Figure 18:
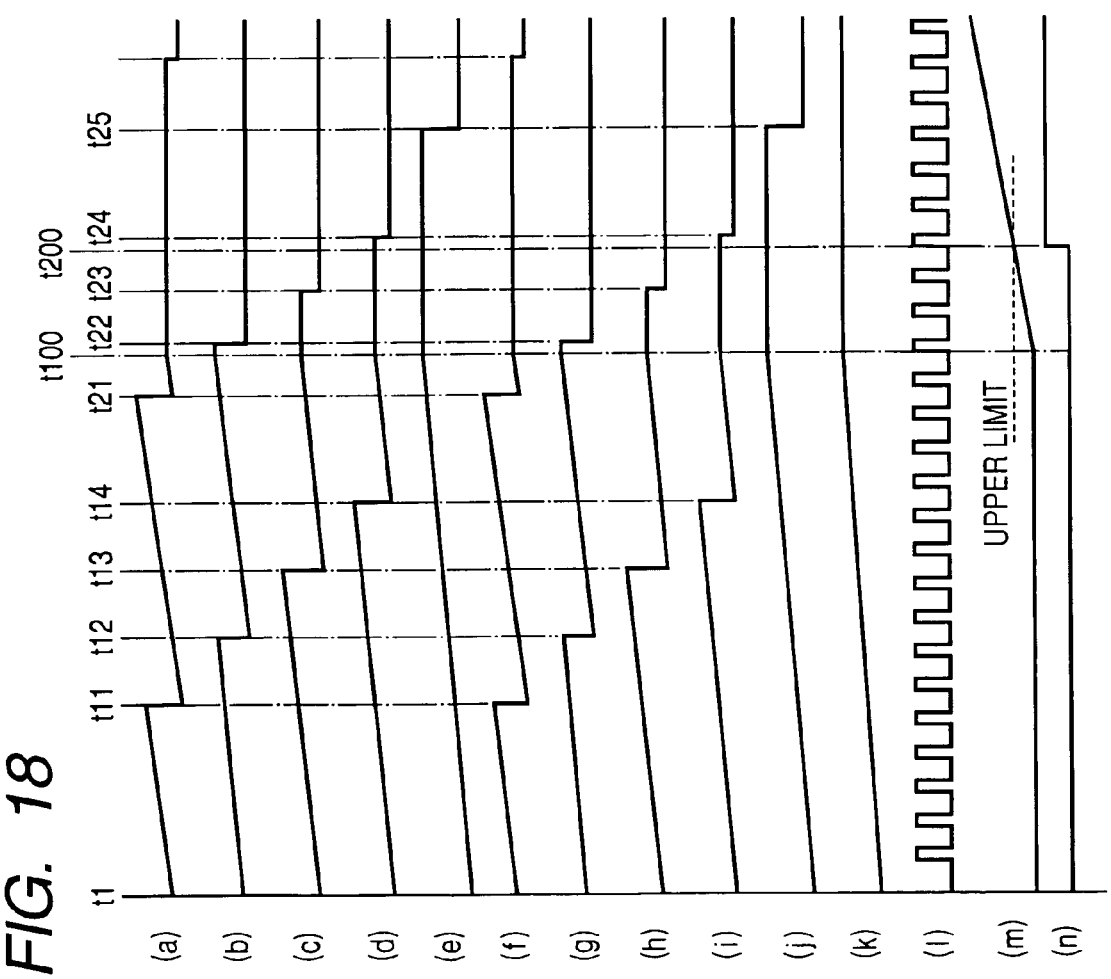

FIGS. 17 and 18 are timecharts which represent the fail-safe operation of the electronic control system 100 for ensuring the safety of the operation of the throttle valve. The following discussion will refer, as an example, to the case where the output from the monitor module 115 indicates that the monitor module 120 is failing in the monitoring operation thereof.

Lines (a) through (i) in FIG. 17 represent respectively:
(a) RAM Check Monitor Completion Flag;
(b) Instruction Check Monitor Completion Flag,
(c) Flow Check Monitor Completion Flag;
(d) System Check Monitor Completion Flag;
(e) ROM Check Monitor Completion Flag;
(f) Data Transmission (RAM check);
(g) Data Transmission (Instruction check);
(h) Data Transmission (Flow check);
(i) Data Transmission (System check); and
(j) Data Transmission (ROM check).

Lines (a) through (n) in FIG. 18 represent respectively:
(a) Data Error Count (RAM check);
(b) Data Error Count (Instruction check);
(c) Data Error Count (Flow check);
(d) Data Error Count (System check),
(e) Data Error Count (ROM check);
(f) Com. Error Count (RAM check);
(g) Com. Error Count (Instruction check);
(h) Com. Error Count (Flow check);
(i) Corn. Error Count (System check);
(j) Corn. Error Count (ROM check),
(k) Reference Count;
(l) Reference Count Sampling Cycle; and
(m) Malfunction Decision Count; and
(n) Fail-Safe Mode.

When the controller 112 are now computing the controlled variable of the throttle valve (i.e., the motor 500), the self-monitor 113 starts to monitor the above described five subjects, that is, performs the ROM check, the RAM check, the instruction check, the flow check, and the system check at given intervals. Upon completion of monitoring of each of the five subjects, the self-monitor 113 sets a corresponding one of the monitor completion flags, as illustrated in (a) to (e) of FIG. 17, and stores it in the memory. Note that the execution cycle of the ROM check, as illustrated in (e) of FIG. 17, is longer than those of the other subjects, as illustrated in (a) to (d) of FIG. 17.

The communication circuit 114 is, as illustrated in (f) to (j) of FIG. 17, responsive to each of the monitor completion flags to transmit the data, as described in FIG. 12, to the monitor module 120. However, when another data is being transmitted, the communication circuit 114 performs the time-sharing to delay the transmission of the former.

The monitor module 120 analyzes the identifier added to the data transmitted from the communication circuit 114 and gives the data to one of the digital circuit blocks 121a to 121e which is specified by the identifier. The one of the digital circuit blocks 121a to 121e, as illustrated in (a) to (j) of FIG. 18, clears the data error counter 154 and the communication error counter 157.

For instance, at each of times t11 and t21, as demonstrated in (f) of FIG. 17, the communication circuit 114 provides the data on the RAM check to the digital circuit block 121b of the monitor module 120. This causes, as demonstrated in (a) and (f) of FIG. 18, the count values of the data error counter 154 and the communication error counter 157 of the digital circuit block 121b to be cleared to zero (0) at each of times t11 and t21.

At each of times t12 and t22, as demonstrated in (g) of FIG. 17, the communication circuit 114 provides the data on the instruction check to the digital circuit block 121c of the monitor module 120. This causes, as demonstrated in (b) and (g) of FIG. 18, the count values of the data error counter 154 and the communication error counter 157 of the digital circuit block 121c to be cleared to zero (0) at each of times t12 and t22.

At each of times t13 and t23, as demonstrated in (h) of FIG. 17, the communication circuit 114 provides the data on the flow check to the digital circuit block 121d of the monitor module 120. This causes, as demonstrated in (c) and (h) of FIG. 18, the count values of the data error counter 154 and the communication error counter 157 of the digital circuit block 121d to be cleared to zero (0) at each of times t12 and t22.

At each of times t14 and t24, as demonstrated in (i) of FIG. 17, the communication circuit 114 provides the data on the system check to the digital circuit block 121e of the monitor module 120. This causes, as demonstrated in (d) and (i) of FIG. 18, the count values of the data error counter 154 and the communication error counter 157 of the digital circuit block 121e to be cleared to zero (0) at each of times t14 and t24.

At time t25, as demonstrated in (j) of FIG. 17, the communication circuit 114 provides the data on the ROM check to the digital circuit block 121a of the monitor module 120. This causes, as demonstrated in (e) and (j) of FIG. 18, the count values of the data error counter 154 and the communication error counter 157 of the digital circuit block 121a to be cleared to zero (0) at each of time t25.

The module monitor 115, as already described, works to monitor the count value of the reference counter 126, as demonstrated in (k) of FIG. 18, and determine whether the monitor module 120 is failing in the monitoring operation thereof or not.

For instance, as demonstrated in Figs. (l), (m), and (n) of FIG. 18, the module monitor 115 acquires the count value of the reference counter 126 cyclically and analyzes a variation in the count value that is a difference between the current count value and the last one. When such a count value variation falls out of the permissible range at time t100, the microcomputer 110 determines that the count values of the data error counter 154 or the communication error counter 157 of each of the digital circuit blocks 121a to 121e, as illustrated in (a) to (j) of FIG. 18, are in error and starts to count up the malfunction decision counter installed therein, as demonstrated in (m) of FIG. 18. When the count value of the malfunction decision counter exceeds the upper limit at time t200, the module monitor 115 determines that the monitor module 120 is failing to monitor the malfunction of the microcomputer 110 (i.e., the self-monitor 113) and outputs a signal indicative thereof to the driver circuit 130. The driver circuit 130 then cuts a supply of power from the battery to place the throttle valve in the fail-safe mode.

As apparent from the above discussion, the electronic control system 100 have the following operational advantages.

1) The microcomputer 110 is designed to transmit the computed value and the expected value, as used in monitoring each of the five subjects, to the monitor module 120 in parallel to, i.e., simultaneously with the monitoring of the controller 112 through the self-monitor 113. The monitor module 120 compares the computed value with the expected value and determines whether the self-monitor 113 is functioning properly or not. This enables the microcomputer 110 to monitor itself to improve the reliability in controlling the operation of a vehicle-mounted actuator such as the throttle valve.

2) When a period of time in which the computed value continues not to coincide with the expected value exceeds the given period of time, the monitor module 120 decides that the self-monitor 113 is not operating properly. This ensures the reliability in monitoring the operation of the self-monitor 113.

3) When a period of time in which the monitor module 120 continues to fail to receive the data on the computed value and the expected value exceeds the given period of time, the monitor module 120 decides that the communication with the microcomputer 110 is malfunctioning. This enhances the reliability in monitoring the operation of the self-monitor 113 further.

4) The module monitor 115 is designed to analyze the count value of the reference counter 126 of the monitor module 120 to indirectly monitor the operations of the data error counters 154 and the communication error counters 157 of the monitor module 120. If the count value of the reference counter 126 is in error, the module monitor 115 determines that the monitor module 120 is failing in operation thereof.

5) The module monitor 115 samples the count value of the reference counter 126 cyclically. When a period of time in which the count value continues not to change, the module monitor 115 decides that the monitor module 120 is malfunctioning. This ensures the reliability in monitoring the operation of the monitor module 120.

6) The monitor module 120 includes the malfunction monitor 121 made up of the digital circuit blocks 121a to 121e which function to monitor the validity of monitoring of the five subjects: the ROM check, the RAM check, the instruction check, the flow check, and the system check. The monitor module 120 inputs each of combinations of the computed and expected values into a corresponding one of the digital circuit blocks 121a to 121e. Each of the digital circuit blocks 121a to 121e functions to compare the computed value with the expected value to check the validity of monitoring of the five subjects, thereby monitoring the malfunction of the self-monitor 113.

Figure 19:
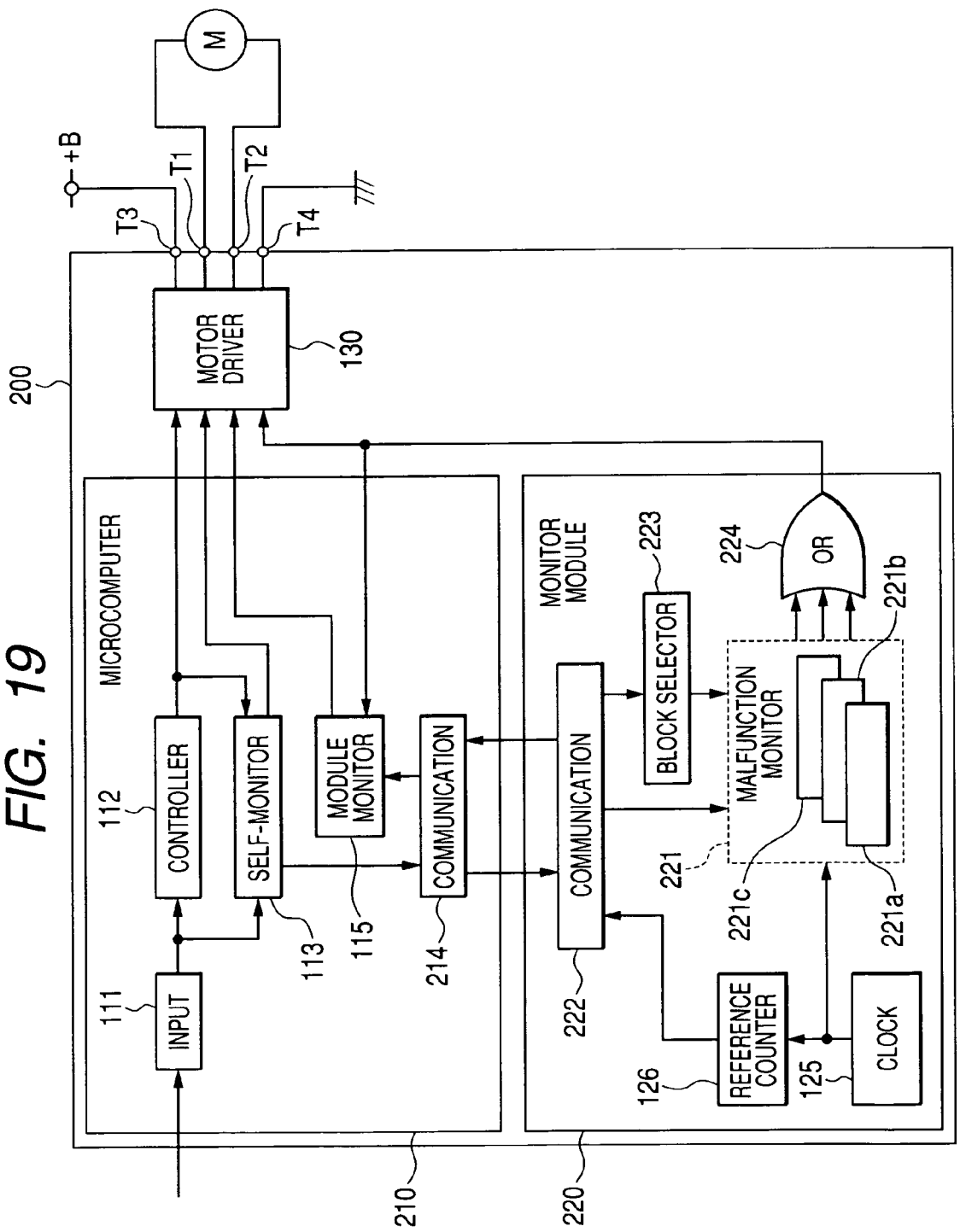
FIG. 19 is a block diagram which shows an electronic control system according to the second embodiment of the invention.

FIG. 19 shows an electronic control system 200 according to the second embodiment of the invention which is equipped with a microcomputer 210 designed to break down, in a communication circuit 214, the five subjects (i.e., the ROM check, the RAM check, the instruction check, the flow check, and the system check) to be monitored into three by monitoring operation modes thereof and transmit data on the computed and expected values in each of the monitoring operation modes to a monitor module 220.

The monitor module 220 includes a malfunction monitor 221 made up of three digital circuit blocks 221a, 221b, and 221c to monitor the malfunction of the self-monitor 113 in terms of the monitoring operation modes. Each of the digital circuit blocks 221a to 221c works to compare the computed and expected values in the subjects common to one of the monitoring operation modes to monitor the malfunction of the self-monitor 113. This result in a simplified structure of the monitor module 220 and a decreased total cost of the electronic control system 200.

Specifically, the communication circuit 214 of the microcomputer 210 first classifies the five subjects into two groups: one including the ROM check, the RAM check, the instruction check, and the flow check which require the determination of whether the computed value coincides with the expected value or not, and the other including the system check which requires the determination of whether the computed value is greater than the expected value or not. The communication circuit 214 also classifies the first group of the ROM check, the RAM check, the instruction check, and the flow check into two groups: one including the RAM check, the instruction check, and the flow check which are to be executed in shorter cycles, and the other including the ROM check which is to be executed in a longer cycle. Specifically, the communication circuit 214 outputs the data on the computed and expected values for each of the first group consisting of the RAM check, the instruction check, and the flow check, the second group consisting of the ROM check, and the third group consisting of the system check.

The malfunction monitor 221 of the monitor module 220 includes a digital circuit block 221a for the first group, a digital circuit block 221b for the second group, and a digital circuit block 221c for the third group. The digital circuit blocks 221 and 221b each have substantially the same structure as that of the digital circuit block 121a, as illustrated in FIG. 13. The digital circuit block 221c has substantially the same structure as that of the digital circuit block 121e.

The monitor module 220 also includes a block selector 223 and an OR circuit 224. The block selector 223 works to transmit data on the first group consisting of the RAM check, the instruction check, and the flow check to the digital circuit block 221a. Specifically, the digital circuit block 221a is used in determining the validity of each of the RAM check, the instruction check, and the flow check. This results in a simplified structure of the monitor module 220.

The block selector 223 also transmits data on the second group consisting of the ROM check to the digital circuit block 221b. The digital circuit block 221a serves to determine the validity of each of the ROM check. This avoids the interference of monitoring of the ROM check executed at a longer cycle with monitoring of the RAM check, the instruction check, and the flow check executed at shorter cycles, thus permitting the malfunction of the self-monitor 113 to be found quickly.

The block selector 223 also transmits data on the third group consisting of the system check to the digital circuit block 221c to determine the validity of the system check.

When it is required to transmit the computed values and the expected values used in the first group of the RAM check, the instruction check, and the flow check to the monitor module 220, the communication circuit 214 first produces the sum of the computed values and transmits it together with an expected value, as stored in a memory as a correct value of the sum, to the communication circuit 222 of the monitor module 220. The monitor module 220 sends the inputs to the digital circuit block 221a through the block selector 223. The digital circuit block 221a determines whether the sum of the computed values is coincident with the expected value or not to determine whether the self-monitor 113 is functioning properly or not.

Figure 20:
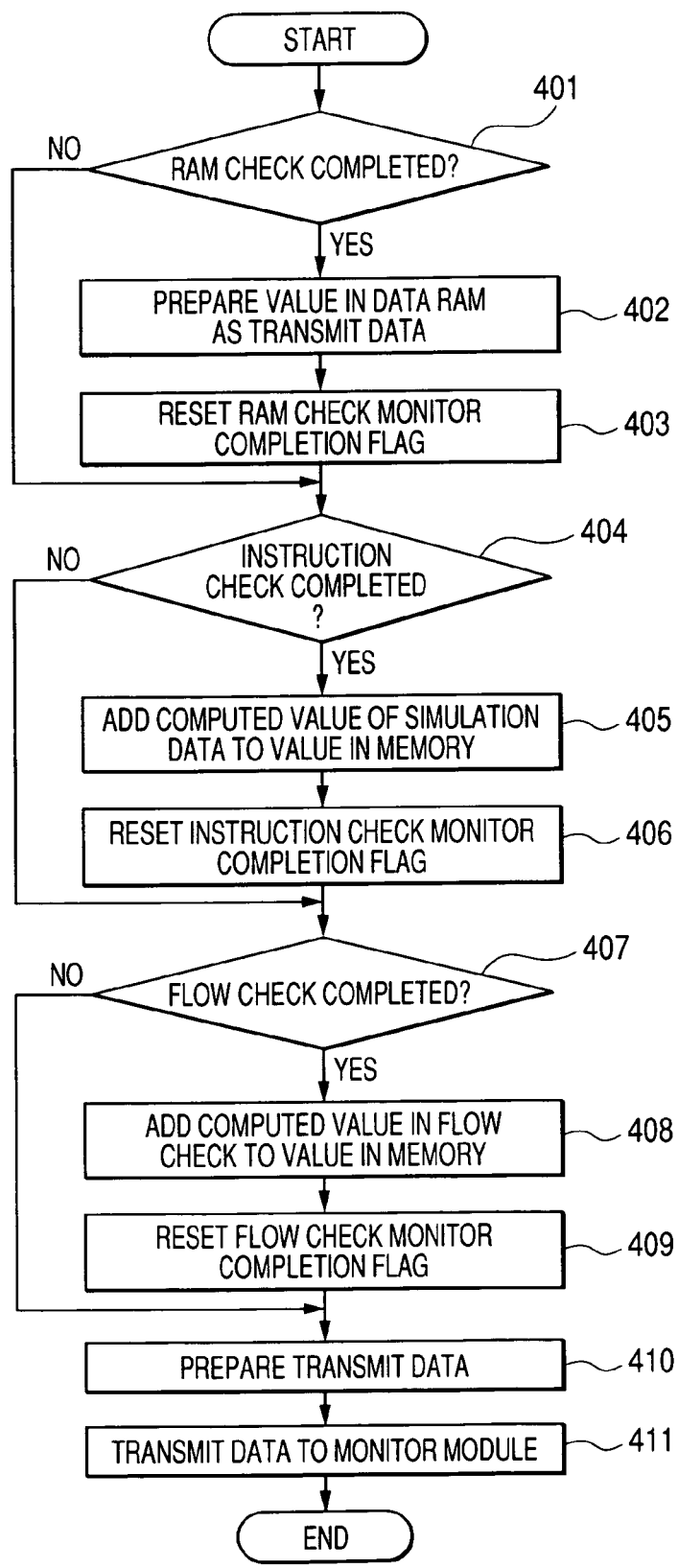
FIG. 20 is a flowchart of a data transmission program to be executed by a microcomputer of the electronic control system of FIG. 19 to transmit data on three monitored subjects to a monitor module.

FIG. 20 is a flowchart of a transmission control program to be executed by the communication circuit 214 of the microcomputer 210 to transmit the data on the first group of the RAM check, the instruction check, and the flow check to the monitor module 220. This program is executed at regular intervals.

After entering the program, the routine proceeds to step 401 wherein it is determined whether the monitor completion flag indicating the completion of the RAM check is set by the self-monitor 113 or not. If a YES answer is obtained meaning that the RAM check has been completed, then the routine proceeds to step 402.

In step 402, the value in the data RAM, as illustrated in FIG. 3, is read out and held in an internal register (not shown) of the microcomputer 110 as transmit data to be transmitted to the monitor module 120. If there is data in the register, it is updated. The routine proceeds to step 403 wherein the monitor completion flag indicating the completion of the RAM check is reset or cleared.

The routine proceeds to step 404 wherein it is determined whether the monitor completion flag indicating the completion of the instruction check is set by the self-monitor 113 or not. If a YES answer is obtained meaning that the instruction check has been completed, then the routine proceeds to step 405 wherein the result of operation on (i.e., the computed value on the simulation data, as illustrated in FIG. 4, is read out of the memory and added to the value in the data RAM, as retained in the register as the transmit data in step 402. The routine proceeds to step 406 wherein the monitor completion flag indicating the completion of the instruction check is reset or cleared.

The routine proceeds to step 407 wherein it is determined whether the monitor completion flag indicating the completion of the flow check is set by the self-monitor 113 or not. If a YES answer is obtained meaning that the flow check has been completed, then the routine proceeds to step 408 wherein the count value of the program counter, as illustrated in FIG. 5, is read out of the memory and added to the transmit data, as retained in the register in step 405 (i.e. the sum of the value of the data RAM and the computed value of the simulation data). The routine proceeds to step 409 wherein the monitor completion flag indicating the completion of the flow check is reset or cleared.

The routine proceeds to step 410 wherein the value stored in the register (i.e., the sum of the value of the data RAM, the computed value of the simulation data, and the count value) is combined with the expected value thereof, as stored in the memory, and an identifier of these values and prepared as transmit data having the structure, as illustrated in FIG. 12. The routine proceeds to step 411 wherein the transmit data, as prepared in step 410, is outputted from the communication circuit 214 to the communication circuit 222 of the monitor module 220 through serial communication or parallel communication.

If a NO answer is obtained in any one of steps 401, 404, and 407, the transmit data including a value, which is different from the expected value as the sum of the value of the data RAM, the computed value of the simulation data, and the count value, is prepared in step 410.

The monitor module 220 analyzes the transmit data, as received through the communication circuit 222, and inputs a combination of the sum of the value of the data RAM, the computed value of the simulation data, and the count value and the expected value to the digital circuit block 221a. The digital circuit block 221a compares the sum with the expected value, determines whether the self-monitor 113 has monitored the RAM check, the instruction check, and the flow check properly or not, and a signal indicative thereof to the OR circuit 224.

The transmission of the ROM check data (i.e., the sum of the control data stored in the ROM area 112a of the program memory 1121 and the expected value (e.g., 5AA5)), as illustrated in FIG. 2, to the monitor module 220 is achieved in the same manner as described in FIG. 7. The transmission of the system check data (i.e., the duty cycle and the upper limit x %), as illustrated in FIG. 6, to the monitor module 220 is achieved in the same manner as described in FIG. 11.

Figure 21:
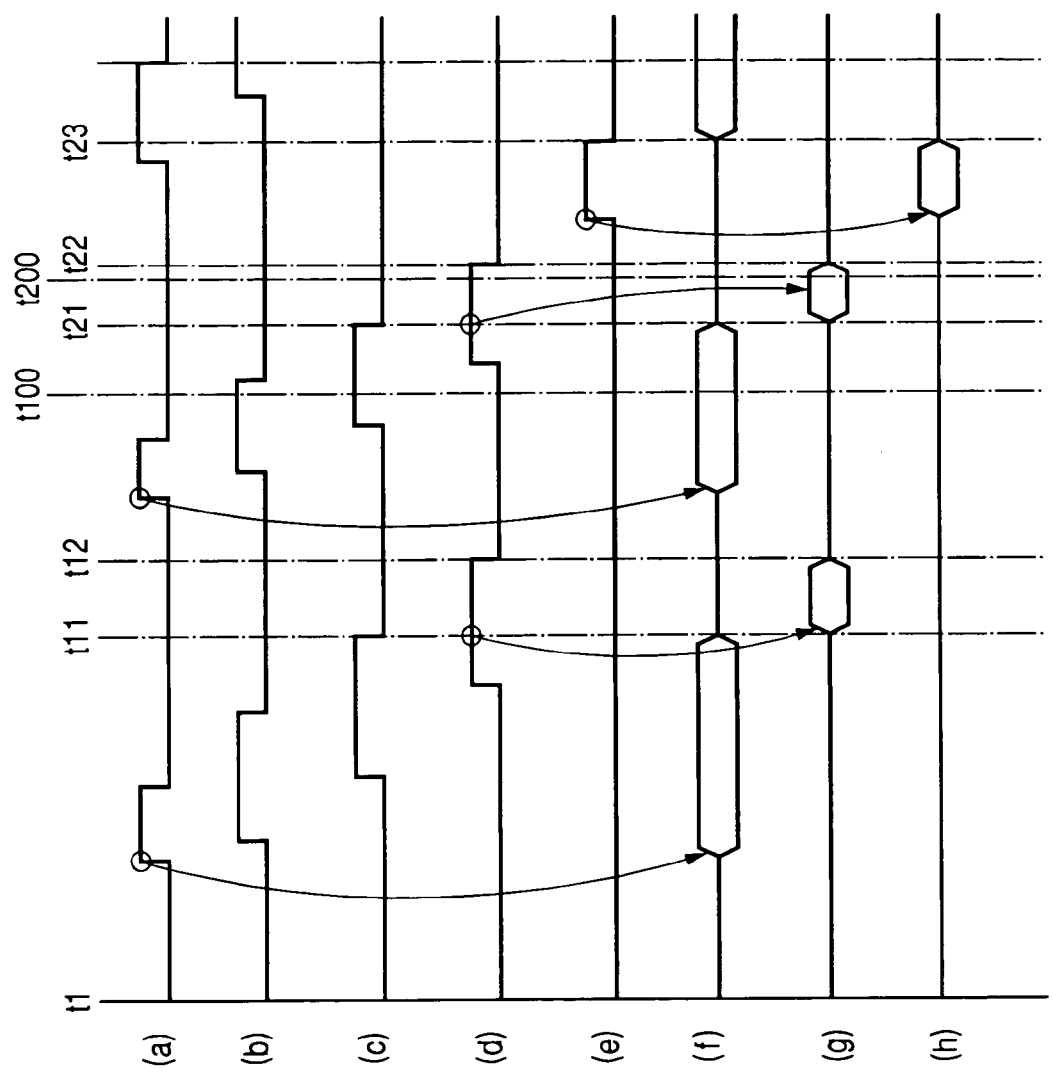
FIGS. 21 and 22 are timecharts which demonstrates operations of the electronic control system of FIG. 19.
Figure 22:
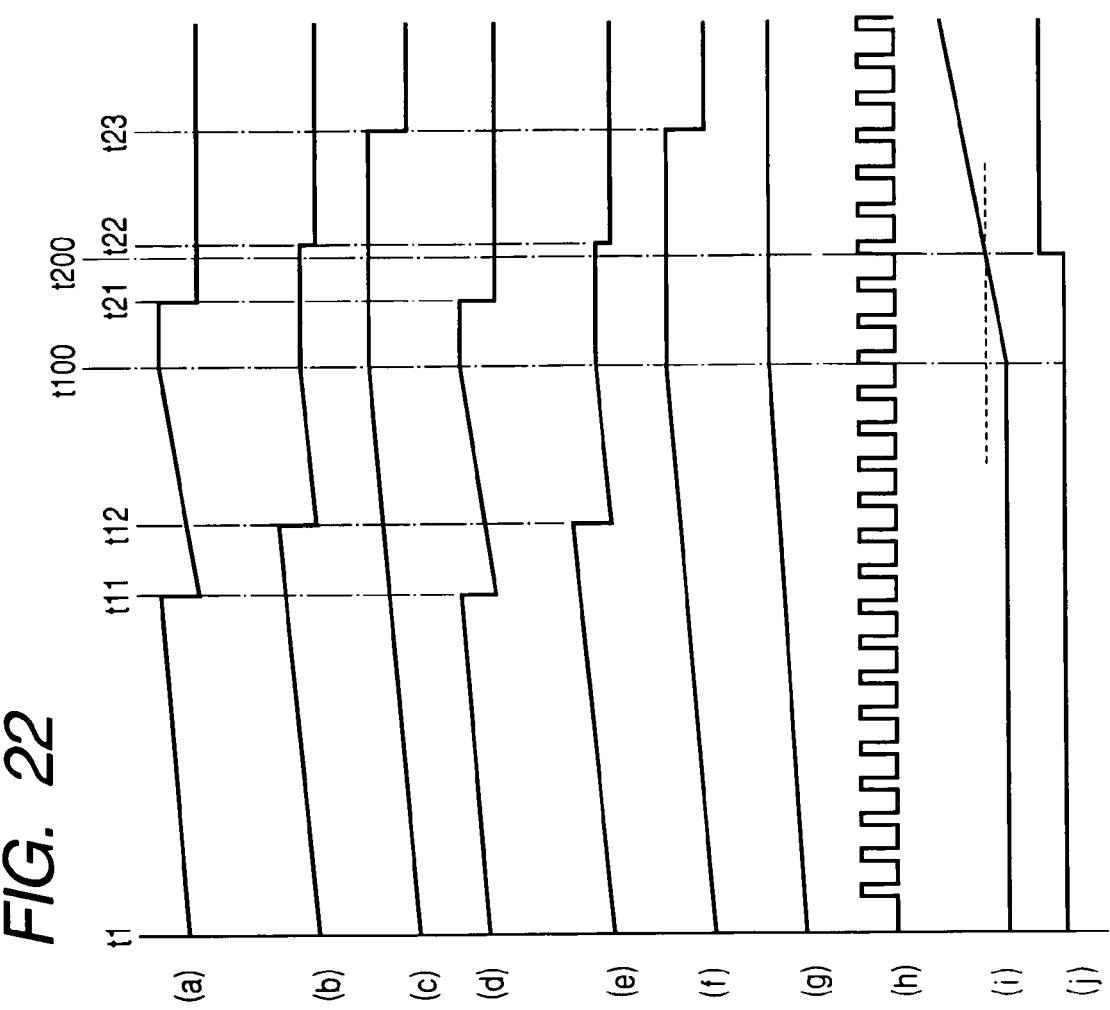

FIGS. 21 and 22 are timecharts which represent the fail-safe operation of the electronic control system 200 for ensuring the safety of the operation of the throttle valve. The following discussion will refer, as an example, to the case where the output from the monitor module 115 indicates that the monitor module 220 is failing in the monitoring operation thereof.

Lines (a)-(h) of FIG. 21 represent respectively:
(a) RAM Check Monitor Completion Flag;
(b) Instruction Check Monitor Completion Flag;
(c) Flow Check Monitor Completion Flag;
(d) System Check Monitor Completion Flag;
(e) ROM Check Monitor Completion Flag;
(f) Data Transmission (RAM check, Instruction check. Flow check);
(g) Data Transmission (System check); and
(h) Data Transmission (ROM check).

Lines (a)-(i) of FIG. 22 represent respectively:
(a) Data Error Count (RAM check, Instruction check. Flow check);
(b) Data Error Count (System check);
(c) Data Error Count (ROM check);
(d) Corn. Error Count (RAM check, Instruction check, Flow check);
(e) Com. Error Count (System check);
(f) Com. Error Count (ROM check);
(g) Reference Count;
(h) Reference Count Sampling Cycle;
(i) Malfunction Decision Count; and
(j) Fail Safe Mode.

When the controller 112 are now computing the controlled variable of the throttle valve (i.e., the driver command to the motor 500), the self-monitor 113 starts to performs the ROM check, the RAM check, the instruction check, the flow check, and the system check at given intervals. Upon completion of monitoring of each of the five subjects, the self-monitor 113 sets a corresponding one of the monitor completion flags, as illustrated in (a) to (e) of FIG. 21, and stores it in the memory. Note that the execution cycle of the ROM check, as illustrated in (e) of FIG. 21, is longer than those of the other monitored subjects, as illustrated in (a) to (d) of FIG. 21.

The communication circuit 214 is, as demonstrated in (f) to (h) of FIG. 21, responsive to each of the monitor completion flags to transmit the data on a corresponding one of the first to third group to the monitor module 220. However, when another data is being transmitted, the communication circuit 114 performs the time-sharing to delay the transmission of the former.

The monitor module 220 analyzes the identifier added to the data transmitted from the communication circuit 114 and gives the data to one of the digital circuit blocks 221a to 221c which is specified by the identifier. The one of the digital circuit blocks 221a to 221c, as illustrated in (a) to (f) of FIG. 22, clears the data error counter 154 and the communication error counter 157.

For instance, at each of times t11 and t21, as demonstrated in (f) of FIG. 21, the communication circuit 214 provides the data on the first group of the RAM check, the instruction check, and the flow check to the digital circuit block 221b of the monitor module 220. This causes, as demonstrated in (a) and (d) of FIG. 22, the count values of the data error counter 154 and the communication error counter 157 of the digital circuit block 221b to be cleared to zero (0) at each of times t11 and t21.

At each of times t12 and t22, as demonstrated in (g) of FIG. 21, the communication circuit 214 provides the data on the system check to the digital circuit block 221c of the monitor module 220. This causes, as demonstrated in (b) and (e) of FIG. 22, the count values of the data error counter 154 and the communication error counter 157 of the digital circuit block 221c to be cleared to zero (0) at each of times t12 and t22.

At time t23, as demonstrated in (h) of FIG. 21, the communication circuit 214 provides the data on the ROM check to the digital circuit block 121a of the monitor module 220. This causes, as demonstrated in (c) and (f) of FIG. 22, the count values of the data error counter 154 and the communication error counter 157 of the digital circuit block 221a to be cleared to zero (0) at time t23.

The module monitor 115, as already described, works to monitor the count value of the reference counter 126, as demonstrated in (g) of FIG. 22, and determine whether the monitor module 220 is failing in the monitoring operation thereof or not.

For instance, as demonstrated in Figs. (h), (i), and (j) of FIG. 22, the module monitor 115 samples the count value of the reference counter 126 cyclically and analyzes a variation in the count value that is a difference between the current count value and the last one. When such a count value variation falls out of the permissible range at time t100, the microcomputer 210 determines that the count values of the data error counter 154 or the communication error counter 157 of each of the digital circuit blocks 221a to 221c, as illustrated in (a) to (f) of FIG. 22, are in error and starts to count up the malfunction decision counter installed therein. When the count value of the malfunction decision counter exceeds the upper limit at time t200, the module monitor 115 determines that the monitor module 220 is failing to monitor the malfunction of the microcomputer 210 (i.e., the self-monitor 113) and outputs a signal indicative thereof to the driver circuit 130. The driver circuit 130 then cuts a supply of power from the battery to place the throttle valve in the fail-safe mode.

The digital circuit block 221a may alternatively be designed to perform monitoring operations on the data used in the RAM check, the instruction check, and the flow check (i.e., the first group) separately. In this case, the communication circuit 222 works to transmit combinations of the computed values and the expected values in the RAM check, the instruction check, and the flow check to the malfunction monitor 221 through a time-sharing system.

The digital circuit block 221a or 221b may alternatively be shared with the first group consisting of the RAM check, the instruction check, and the flow check to be executed in a shorter cycle and the second group consisting of the ROM check to executed in a longer cycle. This, however, may cause the monitoring of the second group to obstruct that of the first group, but however, results in a greatly decreased size of the malfunction monitor 221.

The self-monitor 113 may alternatively be designed to monitor more than five subjects different in contents thereof. For example, the self-monitor 113 may be designed to monitor only subjects which require the determination of whether the computed value coincides with the expected value or not. In this case, each of the digital circuit blocks 121a to 121e (or 221a to 221c) may be shaped with some of the subjects which are close in the execution cycle to each other, thereby permitting the determinations of whether the communication between the microcomputer 110 (210) and the monitor module 120 (220) is failing or not and whether the self-monitor 113 is failing in the monitoring operation or not to be made quickly. Those determinations may be made, like the second embodiment, using the sum of computed values, as transmitted from the microcomputer 110 (210), and an expected value thereof. This results in a decrease operation load on the monitor module 120 (220).

The module monitor 115 may be designed to determine that the monitor module 120 (220) is malfunctioning at the time when the count value, as sampled from the reference counter 126, is found unchanged.

The monitor module 120 (220), as described above, receives the data on the five subjects to be monitored (i.e., the combinations of the computed values and the expected values) cyclically. The monitor module may, therefore, be designed to determine that the communication with the microcomputer 110 (210) is failing in the absence of input of the data.

The monitor module 120 (220) may alternatively be designed to determine that the monitoring operation of the microcomputer 110 (210) is falling at the time when the computed value becomes different from the expected value.

Figure 23:
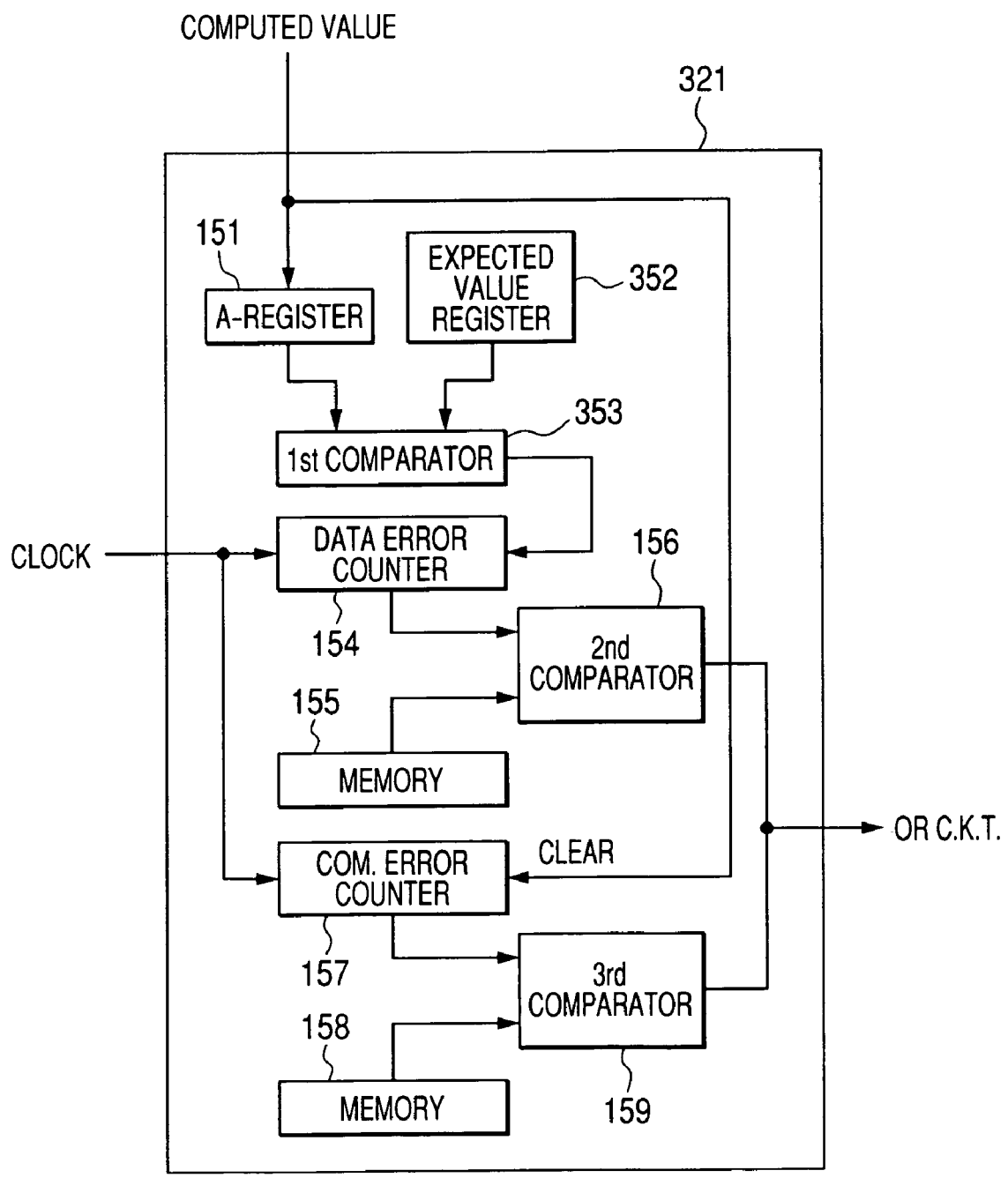
FIG. 23 is a block diagram which shows a modification of a digital circuit block of a monitor module.
Figure 24:
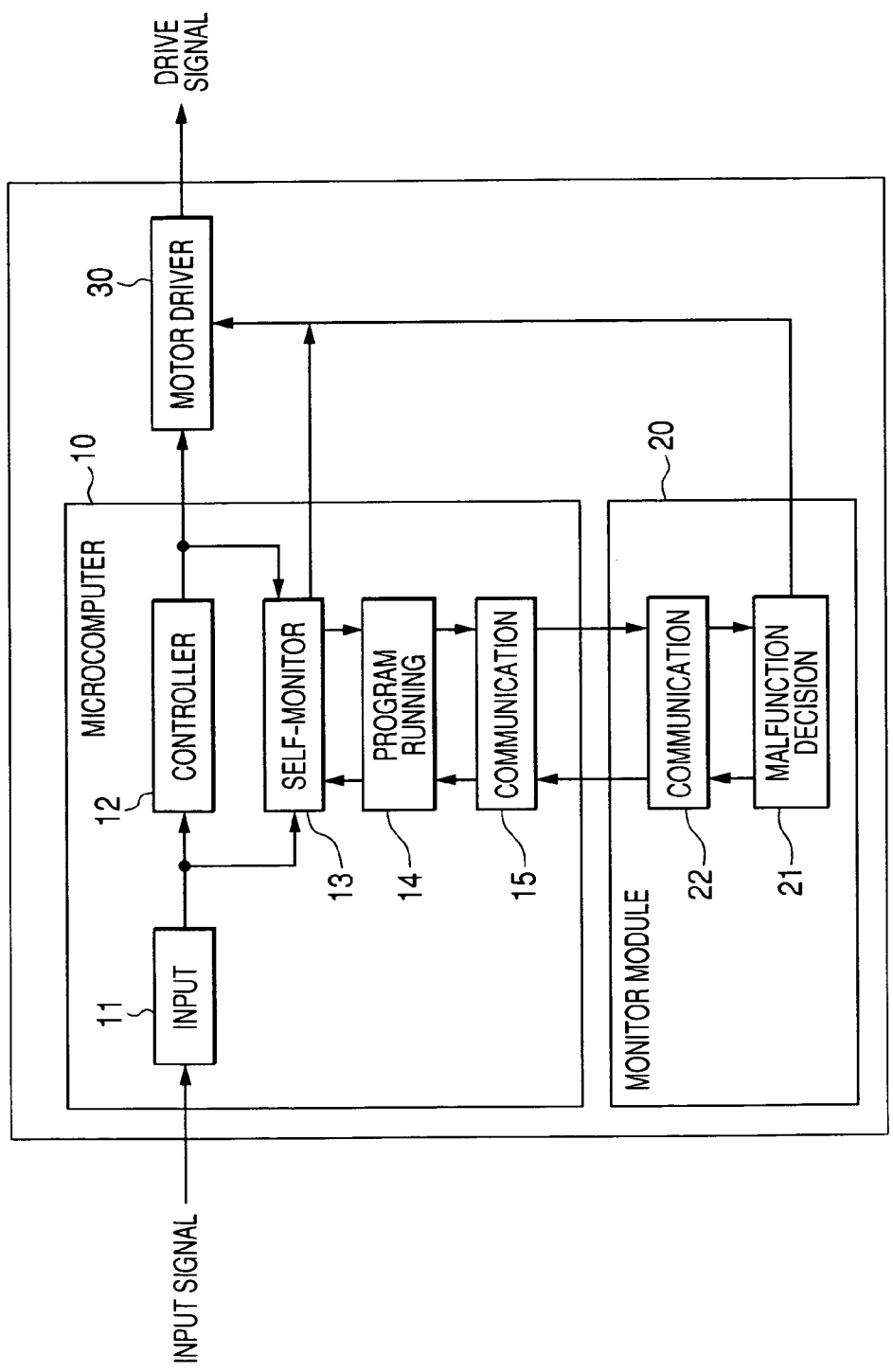
FIG. 24 is a block diagram which shows a prior art electronic control system.

The microcomputer 110 (210) may alternatively be designed to transmit only the computed values to the monitor module 120 (220) in parallel to the monitoring of the controller 112 by the self-monitor 113. In this case, the monitor module 120 (220) is designed to store in an internal memory thereof the expected values each of which is used for comparison with one of the computed values inputted thereto. Specifically, the monitor module 120 (220) is, as illustrated in FIG. 23, equipped with digital circuit blocks 321 (only one is shown for the brevity of illustration). The digital circuit block 321 has an expected value-register 352 instead of the B register 152, as illustrated in FIG. 13. The expected value-register 352 is designed to store one of the expected values which corresponds to the computed value inputted to the digital circuit block 321. A first comparator 353 compares the computed value, as stored in the A register 151, with the expected value, as stored in the expected value-register 352, and outputs a signal indicative thereof to the data error counter 154. The digital circuit block 321 determines whether the self-monitor 113 is operating properly or not simultaneously with the monitoring of the controller 112 by the self-monitor 113. In this case, the microcomputer 120 (220) is preferably engineered to modify the value once computed for use in monitoring the validity of each of the five subjects: the ROM check, the RAM check, the instruction check, the flow check, and the system check, according to a given algorithm to bring it into agreement with a corresponding one of the expected values stored in the expected value-register 352. The microcomputer 120 (220) transmits the thus modified value to the monitor module 120 (220) for comparison with the expected value stored in the expected value-register 352. This facilitates ease of use of the invention with typical electronic control systems for automotive vehicles.

The above structure may be designed not to make determinations of whether the communication between the microcomputer 110 (210) and the monitor modules 120 (220) is failing or not and whether the monitor module 120 (220) is malfunctioning or not through the module monitor 115. Further, the monitoring of the controller 112 by the self-monitor 113 and the monitoring of the self-monitor 113 by the monitor module 120 (220) may not always be performed in parallel to each other.

The subjects to be monitored may include subjects in which the computed value changes as a function of an operation condition of the engine of the vehicle.

While the present invention has been disclosed in terms of the preferred embodiments in order to facilitate better understanding thereof, it should be appreciated that the invention can be embodied in various ways without departing from the principle of the invention. Therefore, the invention should be understood to include all possible embodiments and modifications to the shown embodiments witch can be embodied without departing from the principle of the invention as set forth in the appended claims.

What is claimed is:

1. An electronic control apparatus for a vehicle comprising:
a microcomputer including an actuator controller and a controller monitor, the actuator controller working to control an operation of an actuator mounted in a vehicle in response to an input signal indicating a parameter associated with a preselected operating condition of the vehicle, the controller monitor working to monitor validity of a monitor parameter, associated with an operation of the actuator controller and being obtained thereby with computation by the microcomputer, by comparing the monitor parameter and an expected value of the monitor parameter, said controller monitor working to monitor whether the actuator controller is operating properly or not based on the monitored validity of the monitor parameter, said microcomputer outputting the monitor parameter and the expected value of the monitor parameter; and
a monitor module including a digital circuit which is designed to monitor whether said controller monitor is operating properly or not based on comparison between the monitor parameter and the expected value of the monitor parameter, as inputted from said microcomputer, without the monitor module transmitting a test signal to the controller monitor of the microcomputer for monitoring the controller monitor, and to output a signal indicative thereof to an actuator driver; wherein
when a period of time in which the monitor parameter continues to be different from the expected value of the monitor parameter exceeds a predetermined time, said monitor module determines that the controller monitor is malfunctioning; and
said monitor module is equipped with a data error counter which counts up in response to input from a plurality of clocks, as used to determine a reference speed at which the digital circuit operates, and is cleared upon agreement of the monitor parameter with the expected value of the monitor parameter, and wherein when a count value of the data error counter exceeds a preselected value, said monitor module determines that the period of time in which the monitor parameter continues to be different from the expected value of the monitor parameter has exceeded the predetermined time.

2. An electronic control apparatus as set forth in claim 1, wherein said monitor module is also equipped with a reference counter which counts up in response to input of each of the clocks, and wherein said microcomputer also includes a module monitor designed to analyze a count value of the reference counter to determine whether said monitor module is operating properly or not.

3. An electronic control apparatus as set forth in claim 2, wherein said module monitor works to sample the count value of the reference counter cyclically and determines that said monitor module is malfunctioning when a period of time in which the count value continues to be unchanged exceeds a preselected time.

4. An electronic control apparatus for a vehicle comprising:
a microcomputer including an actuator controller and a controller monitor, the actuator controller working to control an operation of an actuator mounted in a vehicle in response to an input signal indicating a parameter associated with a preselected operating condition of the vehicle, the controller monitor working to monitor validity of a monitor parameter, associated with an operation of the actuator controller and being obtained thereby with computation by the microcomputer, by comparing the monitor parameter and an expected value of the monitor parameter, said controller monitor working to monitor whether the actuator controller is operating properly or not based on the monitored validity of the monitor parameter, said microcomputer outputting the monitor parameter and the expected value of the monitor parameter; and
a monitor module including a digital circuit which is designed to monitor whether said controller monitor is operating properly or not based on comparison between the monitor parameter and the expected value of the monitor parameter, as inputted from said microcomputer, without the monitor module transmitting a test signal to the controller monitor of the microcomputer for monitoring the controller monitor, and to output a signal indicative thereof to an actuator driver; wherein:
when a period of time in which the monitor parameter and the expected value of the monitor parameter have failed to be received by the monitor module exceeds a preselected time, said monitor module determines that communication with said microcomputer is failing; and
said monitor module is equipped with a communication error counter which counts up in response to input from a plurality of clocks, as used to determine a reference speed at which the digital circuit operates, and is cleared when said monitor module has received the monitor parameter and the expected value of the monitor parameter, and wherein when a count value of the communication error counter exceeds a preselected value, said monitor module determines that the communication with said microcomputer is failing.

5. An electronic control apparatus as set forth in claim 4, wherein said monitor module is also equipped with a reference counter which counts up in response to input of each of the clocks, and wherein said microcomputer also includes a module monitor designed to analyze a count value of the reference counter to determine whether said monitor module is operating properly or not.

6. An electronic control apparatus as set forth in claim 5, wherein said module monitor works to sample the count value of the reference counter cyclically and determines that said monitor module is malfunctioning when a period of time in which the count value continues to be unchanged exceeds a preselected time.

7. An electronic control apparatus for a vehicle comprising:
a microcomputer including an actuator controller and a controller monitor, the actuator controller working to control an operation of an actuator mounted in a vehicle in response to an input signal indicating a parameter associated with a preselected operating condition of the vehicle, the controller monitor working to monitor validity of a monitor parameter, associated with an operation of the actuator controller and being obtained thereby with computation by the microcomputer, by comparing the monitor parameter and an expected value of the monitor parameter, said controller monitor working to monitor whether the actuator controller is operating properly or not based on the monitored validity of the monitor parameter, said microcomputer outputting the monitor parameter and the expected value of the monitor parameter; and
a monitor module including a digital circuit which is designed to monitor whether said controller monitor is operating properly or not based on comparison between the monitor parameter and the expected value of the monitor parameter, as inputted from said microcomputer, without the monitor module transmitting a test signal to the controller monitor of the microcomputer for monitoring the controller monitor, and to output a signal indicative thereof to an actuator driver;
wherein said controller monitor also monitors validity of an additional monitor parameter, which ensures validity of the operation of the actuator controller, based on the additional monitor parameter and an expected value thereof, wherein said microcomputer adds an identifier to a combination of each of the monitor parameters and a corresponding one of the expected values of the monitor parameters and transmits the combinations to said monitor module in the form of data signals, wherein said monitor module also includes an additional digital circuit and analyzes the identifiers of the data signals to provide each of the combinations of the computed and expected values to a corresponding one of the digital circuits, and wherein each of the digital circuits compares the monitor parameter with the expected value of the monitor parameter to determine whether said controller monitor is operating properly or not.

8. An electronic control apparatus as set forth in claim 7, wherein said monitor module includes, as the digital circuits, a first digital circuit and a second digital circuit, the first digital circuit being designed to determine whether the monitor parameter is coincident with the expected value of the monitor parameter or not to monitor whether said controller monitor is operating properly or not, the second digital circuit being designed to determine whether monitor parameter is greater than the expected value of the monitor parameter or not to monitor whether said controller monitor is operating properly or not.

9. An electronic control apparatus as set forth in claim 7, wherein the monitor parameters to be monitored by said controller monitor are two of (1) a control program which is stored in a read-only memory installed in said microcomputer and to be executed by said actuator controller, (2) data which is stored in a data RAM installed in said microcomputer as a value computed by said actuator controller, (3) a fixed value which is a value derived by computing simulation data in said actuator controller, (4) an order in which functions are read out by the actuator controller, and (5) a value computed by the actuator controller based on the input signal indicating the parameter associated with a preselected operation of the vehicle.

10. An electronic control apparatus for a vehicle comprising:
a microcomputer including an actuator controller and a controller monitor, the actuator controller working to control an operation of an actuator mounted in a vehicle in response to an input signal indicating a parameter associated with a preselected operating condition of the vehicle, the controller monitor working to monitor validity of a monitor parameter, associated with an operation of the actuator controller and being obtained thereby with computation by the microcomputer, by comparing the monitor parameter and an expected value of the monitor parameter, said controller monitor working to monitor whether the actuator controller is operating properly or not based on the monitored validity of the monitor parameter, said microcomputer outputting the monitor parameter and the expected value of the monitor parameter; and
a monitor module including a digital circuit which is designed to monitor whether said controller monitor is operating properly or not based on comparison between the monitor parameter and the expected value of the monitor parameter, as inputted from said microcomputer, without the monitor module transmitting a test signal to the controller monitor of the microcomputer for monitoring the controller monitor, and to output a signal indicative thereof to an actuator driver;
wherein said monitor module also includes a first digital circuit that is said digital circuit and a second digital circuit, wherein said controller monitor also monitors validities of additional monitor parameters, which ensure the validities of the operation of the actuator controller, based on the additional monitor parameters and expected values thereof, respectively, wherein said microcomputer breaks down the monitor parameters into a first and a second group according to modes of monitoring of the monitor parameters, at least the first group comprising a plurality of the monitor parameters, said microcomputer also computing a value as a function of the monitor parameters associated with the first group and outputting a combination of the monitor parameters and an expected value thereof in the form of a first data signal with an identifier and a combination of the monitor parameters associated with the second group and the expected value thereof in the form of a second data signal with an identifier, and wherein the monitor parameter carried by one of the first and second data signals is to be determined by one of the first and second digital circuits of said monitor module whether the monitor parameter is coincident with the expected value of the monitor parameter or not to determine whether said controller monitor is operating properly or not, the monitor parameter carried by the other of the first and second data signals being to be determined by the other of the first and second digital circuits of said monitor module whether the monitor parameter is greater than the expected value of the monitor parameter or not to monitor whether said controller monitor is operating properly or not.

11. An electronic control apparatus as set forth in claim 10, wherein said microcomputer produces a sum of the monitor parameters associated with the first group as the value computed as a function of the monitor parameters associated with the first group and transmits the sum and an expected value thereof to said monitor module in the form of the first data signal, and wherein said monitor module determines through the first digital circuit whether the sum is coincident with the expected value or not to determine whether said controller monitor is operating properly or not.

12. An electronic control apparatus for a vehicle comprising:
a microcomputer including an actuator controller and a controller monitor, the actuator controller working to control an operation of an actuator mounted in a vehicle in response to an input signal indicating a parameter associated with a preselected operating condition of the vehicle, the controller monitor working to monitor validity of a monitor parameter, associated with an operation of the actuator controller and being obtained thereby with computation by the microcomputer, by comparing the monitor parameter and an expected value of the monitor parameter, said controller monitor working to monitor whether the actuator controller is operating properly or not based on the monitored validity of the monitor parameter, said microcomputer outputting the monitor parameter and the expected value of the monitor parameter; and
a monitor module including a digital circuit which is designed to monitor whether said controller monitor is operating properly or not based on comparison between the monitor parameter and the expected value of the monitor parameter, as inputted from said microcomputer, without the monitor module transmitting a test signal to the controller monitor of the microcomputer for monitoring the controller monitor, and to output a signal indicative thereof to an actuator driver;
wherein said monitor module also includes a higher speed digital circuit that is said digital circuit and a lower speed digital circuit, wherein said controller monitor also monitors validities of additional monitor parameters in cycles, respectively, which ensure the validities of the operation of the actuator controller, based on the additional monitor parameters and expected values thereof, wherein said microcomputer breaks down the monitor parameters into a first and a second group, at least the first group comprising a plurality of the monitor parameters to be monitored in ones of the cycles which are shorter and close to each other, said microcomputer also computing a value as a function of the monitor parameters associated with the first group and outputting a combination of the monitor parameter and an expected value thereof in the form of a first data signal with an identifier and a combination of the monitor parameter associated with the second group and the expected value thereof in the form of a second data signal with an identifier, and said monitor module analyzes the identifiers and dispatches the first and second data signals to the higher speed and lower speed digital circuits, respectively, the higher speed digital circuit working to determine whether the monitor parameter and the expected value carried by the first data signal are coincident with each other or not to determine whether said controller monitor is operating properly or not, the lower speed digital circuit working to determine whether the monitor parameter and the expected value carried by the second data signal are coincident with each other to determine whether said controller monitor is operating properly or not.

13. An electronic control apparatus as set forth in claim 12, wherein said microcomputer produces a sum of the monitor parameters associated with the first group and transmits the sum and an expected value thereof to said monitor module in the form of the first data signal, and wherein said monitor module determines through the higher speed digital circuit whether the sum is coincident with the expected value or not to determine whether said controller monitor is operating properly or not.

14. An electronic control apparatus as set forth in claim 12, wherein the monitor parameters to be monitored by said controller monitor are one of (1) data which is stored in a data RAM installed in said microcomputer as a value computed by said actuator controller, (2) a fixed value which is a value derived by computing simulation data in said actuator controller, (3) an order in which functions are read out by the actuator controller, and (4) a value computed by the actuator controller based on the input signal indicating the parameter associated with a preselected operation of the vehicle and a control program which is stored in a read-only memory installed in said microcomputer and to be executed by said actuator controller.

15. An electronic control apparatus for a vehicle comprising:
a microcomputer including an actuator controller and a controller monitor, the actuator controller working to control an operation of an actuator mounted in a vehicle in response to an input signal indicating a parameter associated with a preselected operating condition of the vehicle, the controller monitor working to monitor validities of monitor parameters associated with an operation of the actuator controller and being obtained thereby with computation by the microcomputer to determine whether the actuator controller is operating properly or not, said microcomputer computing the monitor parameters, respectively, and breaking down the monitor parameters at least into a first and a second group according to modes of monitoring of the monitor parameters, at least the first group comprising a plurality of the monitor parameters, said microcomputer also computing a value as a function of the monitor parameters associated with the validities of the first group of the monitor parameters and outputting a combination of the monitor parameter and an expected value thereof in the form of a first data signal with an identifier and a combination of the monitor parameter associated with the second group and the expected value thereof in the form of a second data signal with an identifier; and
a monitor module analyzing the identifiers of the first and second data signals, as inputted from said microcomputer, and dispatching the first and second data signals to a first and a second digital circuit installed in said monitor module, respectively, to determine whether the controller monitor is operating properly or not based on comparison between the monitor parameters and the expected values of the monitor parameters carried by the first and second data signals without the monitor module transmitting a test signal to the controller monitor of the microcomputer for monitoring the controller monitor.

16. An electronic control apparatus as set forth in claim 15, wherein the modes of monitoring of the monitor parameters are modes of the comparison between the monitor parameters and the expected values of the monitor parameters, and wherein the monitor parameter carried by one of the first and second data signals is to be determined by one of the first and second digital circuits of said monitor module whether the monitor parameter is coincident with the expected value of the monitor parameter or not to determine whether said controller monitor is operating properly or not, the monitor parameter carried by the other of the first and second data signals being to be determined by the other of the first and second digital circuits of said monitor module whether the monitor parameter is greater than the expected value of the monitor parameter or not to monitor whether said controller monitor is operating properly or not.

17. An electronic control apparatus as set forth in claim 16, wherein said microcomputer produces a sum of the monitor parameters associated with the first group as the value computed as a function of the monitor parameters associated with the first group and transmits the sum and an expected value thereof to said monitor module in the form of the first data signal, and wherein said monitor module determines through the first digital circuit whether the sum is coincident with the expected value or not to determine whether said controller monitor is operating properly or not.

18. An electronic control apparatus as set forth in claim 15, wherein the monitor parameters to be monitored by said controller monitor are two of (1) a control program which is stored in a read-only memory installed in said microcomputer and to be executed by said actuator controller, (2) data which is stored in a data RAM installed in said microcomputer as a value computed by said actuator controller, (3) a fixed value which is a value derived by computing simulation data in said actuator controller, (4) an order in which functions are read out by the actuator controller, and (5) a value computed by the actuator controller based on the input signal indicating the parameter associated with a preselected operation of the vehicle.

19. An electronic control apparatus as set forth in claim 15, wherein said controller monitor works to monitor the validities of the monitor parameters in cycles, wherein a difference in the mode of monitoring between the first and second groups is a difference in value of the cycles, the cycles of the first group of the monitor parameters being shorter than the cycle of the second group, and wherein said monitor module includes a higher speed digital circuit that is the first digital circuit and a lower speed digital circuit that is the second digital circuit, the higher speed digital circuit working to compare between the monitor parameter and the expected value of the monitor parameter carried by the first data signal, the lower speed digital circuit working to compare between the monitor parameter and the expected value of the monitor parameter carried by the second data signal.

20. An electronic control apparatus as set forth in claim 19, wherein said microcomputer produces a sum of the monitor parameters associated with the first group as the value computed as a function of the monitor parameters associated with the first group and transmits the sum and an expected value thereof to said monitor module in the form of the first data signal, and wherein said monitor module determines through the higher speed digital circuit whether the sum is coincident with the expected value or not to determine whether said controller monitor is operating properly or not.

21. An electronic control apparatus as set forth in claim 19, wherein the monitor parameters to be monitored by said controller monitor are one of (1) data which is stored in a data RAM installed in said microcomputer as a value computed by said actuator controller, (2) a fixed value which is a value derived by computing simulation data in said actuator controller, (3) an order in which functions are read out by the actuator controller, and (4) a value computed by the actuator controller based on the input signal indicating the parameter associated with a preselected operation of the vehicle and a control program which is stored in a read-only memory installed in said microcomputer and to be executed by said actuator controller.

22. An electronic control apparatus as set forth in claim 15, wherein said microcomputer transmits the first and second data signals to said monitor module while at the same time, determining whether the actuator controller is operating properly or not.

23. An electronic control apparatus as set forth in claim 15, wherein when a period of time in which the monitor parameter continues to be different from the expected value of the monitor parameter exceeds a predetermined time, each of the first and second digital circuits of said monitor module determines that the controller monitor is malfunctioning.

24. An electronic control apparatus as set forth in claim 23, wherein each of the first and second digital circuits of said monitor module is equipped with a data error counter which counts up in response to input from a plurality of clocks, as used to determine a reference speed at which the first and second digital circuits operate and is cleared upon agreement of the monitor parameter with the expected value of the monitor parameter, and wherein each of the first and second digital circuits determines that the period of time in which the monitor parameter continues to be different from the expected value of the monitor parameter has exceeded the predetermined time when a count value of a corresponding one of the data error counters exceeds a preselected value.

25. An electronic control apparatus as set forth in claim 24, wherein said monitor module is also equipped with a reference counter which counts up in response to input of each of the clocks, and wherein said microcomputer also includes a module monitor designed to analyze a count value of the reference counter to determine whether said monitor module is operating properly or not.

26. An electronic control apparatus as set forth in claim 25, wherein said module monitor works to sample the count value of the reference counter cyclically and determines that said monitor module is malfunctioning when a period of time in which the count value continues to be unchanged exceeds a preselected time.

27. An electronic control apparatus as set forth in claim 15, wherein when a period of time in which the monitor parameter and the expected value of the monitor parameter have failed to be received by the monitor module exceeds a preselected time, each of the first and second digital circuits of said monitor module determines that the controller monitor is malfunctioning.

28. An electronic control apparatus as set forth in claim 27, wherein each of the first and second digital circuits of said monitor module is equipped with a communication error counter which counts up in response to input from a plurality of clocks, as used to determine a reference speed at which the first and second digital circuits operate and is cleared upon reception of a corresponding one of the first and second data signals, and wherein when a count value of the communication error counter exceeds a preselected value, a corresponding one of the first and second digital circuits determines that the communication with said microcomputer is failing.

29. An electronic control apparatus as set forth in claim 28, wherein said monitor module is also equipped with a reference counter which counts up in response to input of each of the clocks, and wherein said microcomputer also includes a module monitor designed to analyze a count value of the reference counter to determine whether said monitor module is operating properly or not.

30. An electronic control apparatus as set forth in claim 29, wherein said module monitor works to sample the count value of the reference counter cyclically and determines that said monitor module is malfunctioning when a period of time in which the count value continues to be unchanged exceeds a preselected time.

31. An electronic control apparatus as set forth in claim 15, wherein the actuator is a motor serving to control a position of a throttle valve, and wherein when it is determined that the controller monitor is malfunctioning, said microcomputer cuts a supply of power to the motor through a motor driver and at least one of the controller monitor and said monitor module.

32. An electronic control apparatus as set forth in claim 15, wherein the value which is computed by said microcomputer and associated with the validity of the monitor parameter is a value derived by performing a given computation on the input signal indicating the parameter associated with the preselected operating condition of the vehicle.

* * * * *